United States Patent [19]
Araya et al.

[11] Patent Number: 5,938,813
[45] Date of Patent: Aug. 17, 1999

[54] GRANULAR COATED PARTICLES CONTAINING UREA AND METAL NITRATE, AND PROCESS FOR MAKING THE SAME

[75] Inventors: Patricio L. Araya; Armin R. Lauterbach; Jubitza K. Reyes, all of Antofagasta, Chile; A. Michael Huey; James T. Stafford, both of Florence, Ala.; Darren L. Jeffreys, Sheffield, Ala.; A. Ray Shirley, Jr., Florence, Ala.

[73] Assignee: SQM Nitratos, S.A., Santiago, Chile

[21] Appl. No.: 08/788,639

[22] Filed: Jan. 27, 1997

[51] Int. Cl.⁶ .................................. C05C 5/00; C05C 5/02
[52] U.S. Cl. ...................... 71/30; 71/58; 71/59; 71/64.07
[58] Field of Search ............................... 71/58, 59, 64.07, 71/30

[56] References Cited

U.S. PATENT DOCUMENTS

| | | | |
|---|---|---|---|
| 3,353,949 | 11/1967 | Nau | 71/64.07 |
| 3,539,326 | 11/1970 | Otsuka et al. | 71/64.07 |
| 3,617,235 | 11/1971 | Friestad | 71/64.07 |
| 4,142,885 | 3/1979 | Heumann et al. | 71/64.07 |
| 4,560,400 | 12/1985 | Allan et al. . | |
| 4,832,728 | 5/1989 | Allan et al. . | |
| 5,043,007 | 8/1991 | Davis . | |
| 5,139,555 | 8/1992 | Freepons . | |
| 5,417,737 | 5/1995 | Young . | |
| 5,494,498 | 2/1996 | Young . | |

FOREIGN PATENT DOCUMENTS

| | | |
|---|---|---|
| 3300415 | of 0000 | Germany . |
| 822969 | 11/1959 | United Kingdom .................... 71/64.7 |
| 1218176 | 1/1971 | United Kingdom . |
| 2115800 | 9/1983 | United Kingdom . |

OTHER PUBLICATIONS

Compound Fertilizers, Chapter XIX of the Fertilizer Manual, pp. 248–260.
Kirk Othmer: Encyclopedia of Chemical Technology, vol. 23 of the Urea Section, pp. 565–572.

*Primary Examiner*—Wayne Langel
*Attorney, Agent, or Firm*—Pillsbury, Madison & Sutro LLP

[57] ABSTRACT

Granular coated particles suitable for use alone or in combination with other fertilizer particles as an nitrogen-dispersing agricultural fertilizer, and a process for making the granular coated particles are disclosed. The granular coated particles include particles formed from at least one metal nitrate, and a first coating layer surrounding each of the metal nitrate particles. The first coating layer is formed from a mixture containing urea and at least one metal nitrate. The metal nitrate particles each is substantially free and discrete from other metal nitrate particles. The metal nitrate is preferably sodium nitrate or potassium nitrate.

41 Claims, 8 Drawing Sheets

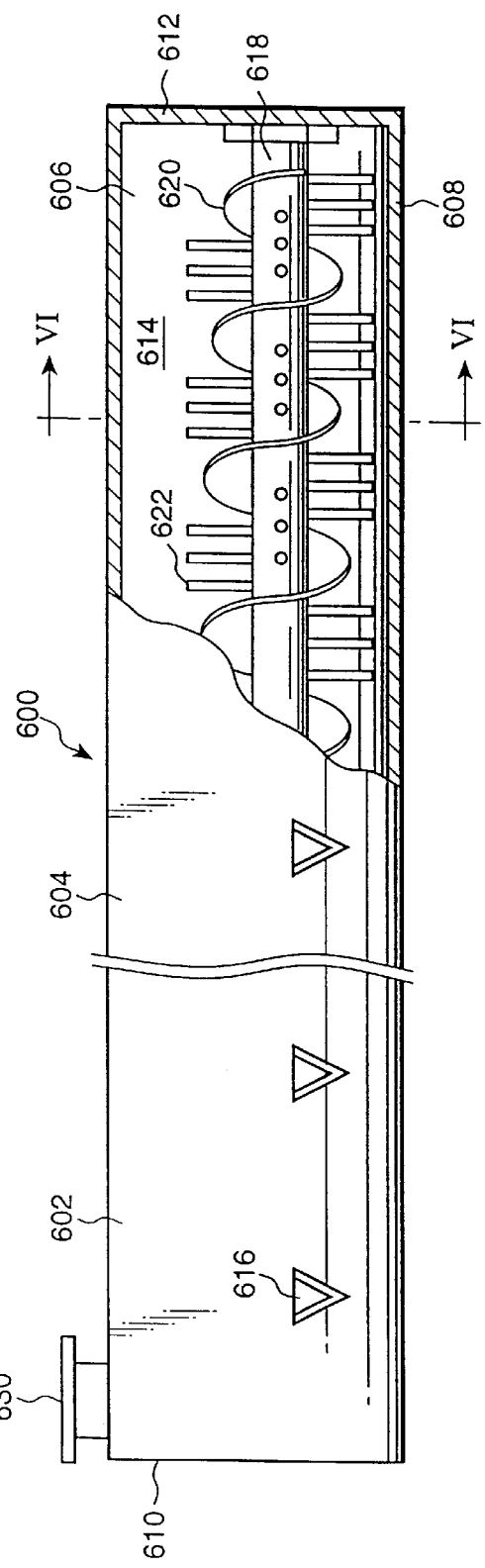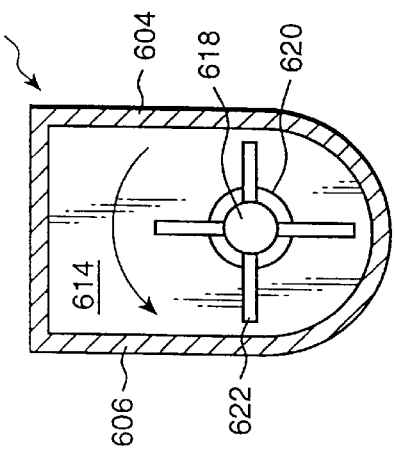

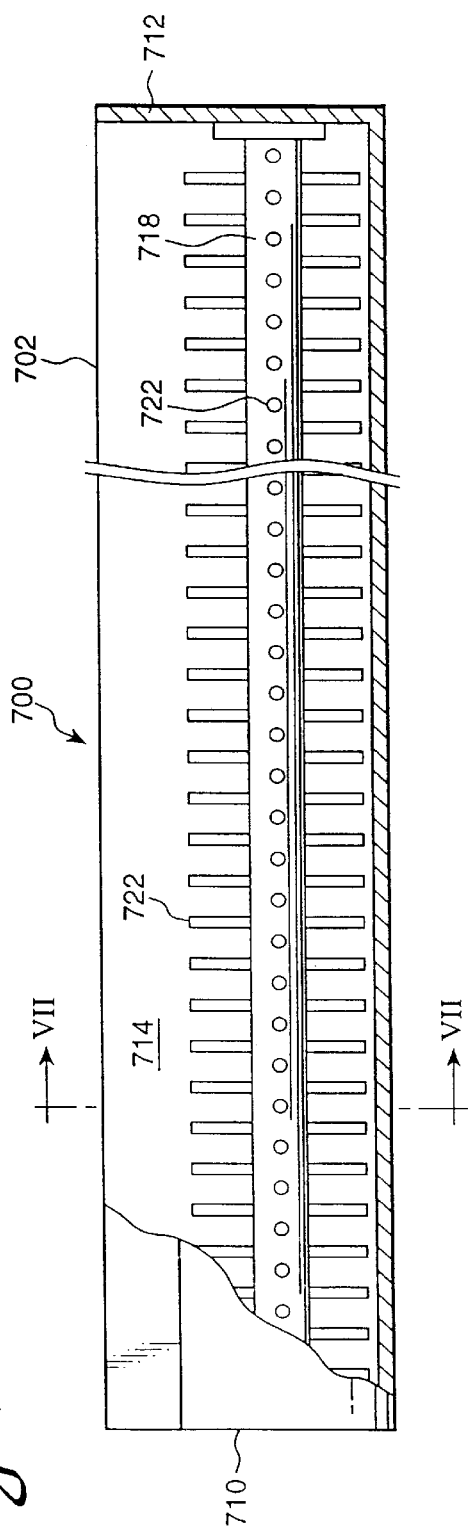
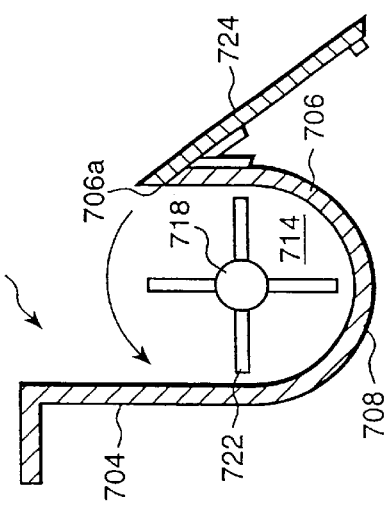

GRANULAR COATED PARTICLES CONTAINING UREA AND METAL NITRATE, AND PROCESS FOR MAKING THE SAME

BACKGROUND OF THE INVENTION

1. Field of Invention

The present invention relates to granular coated particles suitable for use as an agricultural fertilizer, and in particular to granular coated particles suitable for use alone or in combination with other granular particles as a nitrogen-source fertilizer and/or a potassium-source fertilizer. The present invention further relates to a process for preparing the aforementioned granular coated particles, and to a coating and cooling drum arrangement adapted for use in the process.

2. Description of Related Art

Generally, conventional nitrate-containing fertilizers can be classified within one of two categories. The first category relates to fertilizers prepared from nitric acid, which is chemically reacted with, for example, ammonia and/or at least one member selected from the group consisting of phosphate rock, potassium chloride, and limestone. The second category relates to naturally-occurring fertilizers that are either used in their natural state or pretreated prior to use by, for example, purification or metal ion exchange, such as the conversion of sodium nitrate to potassium nitrate.

There are many advantages to the use of nitrates as fertilizers. Nitrogen in nitrate form is more readily available to crops than ammonia-based fertilizers such as urea or ammonium sulfate. Since most crops are more apt to ingest nitrogen in the nitrate form, ammoniacal nitrogen often must be converted to nitrate in the soil before becoming effective as a nitrogen-source fertilizer. For this reason, nitrate fertilizers historically have been the most popular nitrogen fertilizers in most European countries and many other temperate zone countries.

However, there are also profound disadvantages to the use of nitrates as fertilizers. Nitrate fertilizers are diluted in terms of nutrient composition. Of the common nitrate fertilizers, ammonium nitrate has the greatest nitrogen concentrations of about 35% by weight, while sodium nitrate (16.5 wt %), potassium nitrate (13.9 wt %), and calcium nitrate (17.1 wt %) have still lesser nitrogen concentrations. Since nitrate fertilizers have relatively modest nitrogen concentrations, application of large amounts of nitrate fertilizers are often required in practice in order to provide an appropriate amount of nitrogen. This in turn increases the transportation costs associated with the use of nitrate fertilizers.

There are additional reasons why conventional ammonium nitrate fertilizers are not as cost effective as other fertilizers. The cost of materials associated with the production or purchase of conventional ammonium nitrate fertilizers also can have an especially profound financial effect in the agricultural market, where profit margins are often extremely narrow and strongly influenced by such material costs. The production costs associated with the preparation of conventional ammonium nitrate fertilizers are relatively high. Processes for preparing conventional ammonium nitrate fertilizers typically involve multiple steps, including the separate preparation of both the ammonium and metal nitrate constituents, followed by the steps of reacting the constituents to form a melt and granulating or prilling the resulting melt after a concentration step.

In addition to its associated costs, conventional ammonium nitrate fertilizers are moderately explosive. Recently, there has been increasing political pressure directed towards enacting governmental regulations to restrict the sale and use of such potentially dangerous products. Further, these fertilizers are typically devoid of sodium, which is instrumental in preventing soil acidification resulting from nitrification of the soil by ammonium ions.

In order to overcome excessive costs and other problems associated with nitrate fertilizers, it has been proposed to blend nitrate with other granular particles formed of fertilizers having a higher nitrogen concentration than nitrate. For example, urea, which has a nitrate concentration of about 46.3 wt %, has been proposed as a suitable fertilizer for blending with nitrate fertilizers. However, ammonium nitrate granules cannot be blended effectively with urea granules due to the extreme hygroscopicity (critical humidity 18%) of the resultant blend. Accordingly, when ammonium nitrate and urea are mixed, it is usually done to form a liquid fertilizer solution. Blends of separately prepared urea granular particles and metal nitrate granular particles are also plagued by various problems associated with the segregation of one type of particle from the other. High concentrations of one or the other type of the granular particle can result from differences in dimension, shape, and/or specific gravities of the particles. The variable, non-uniform distribution of particles can deleteriously impact the effectiveness of the blended fertilizer in use.

A need therefore exists to provide granular particles adapted for use alone or in combination with other fertilizer particles as a nitrate-containing agricultural fertilizer which affords a uniform distribution of urea and metal nitrate. A need further exists to provide granular particles with an increased nitrogen concentration in comparison to metal nitrate without sacrificing effectiveness. This improves the transportation economics, avoids segregation problems associated with blends, provides a nitrogen ion source for near instant availability of nitrogen to crops, reduces the explosiveness of the fertilizer, and provides a neutralizing sodium source.

SUMMARY OF THE INVENTION

It is, therefore, an object of the present invention to solve the aforementioned problems associated with the related art as well as the need expressed above.

In accordance with the principles of the present invention, this object is obtained by providing granular coated particles suitable for use alone or in combination with other granular coated/non-coated particles as a nitrate and ammoniacal nitrogen-source and/or a potassium source of an agricultural fertilizer. The granular coated particles comprise particles formed from at least one metal nitrate defining a core of the granular coated particles, and a first coating layer surrounding each metal nitrate core particle. The first coating layer is a mixture containing at least urea and the metal nitrate. The mixture has a melting temperature lower than the melting temperature of the metal nitrate, preferably lower than the respective individual melting temperatures of urea and the metal nitrate, and more preferably a eutectic melting temperature. The mixture is formulated from a slurry that, during production, is preferably maintained in a substantially anhydrous state so as to provide the resulting granular coated particles with a relatively high crush strength.

The metal nitrate selected for the core particle and the first coating layer is preferably sodium nitrate or potassium nitrate.

Another object of the present invention is the provision of a process for preparing the granular coated particles. In accordance with the principles of the present invention, this object is obtained by providing a process involving the following steps. A substantially molten mixture, which is substantially anhydrous and comprises a first portion of urea and at least one metal nitrate, is introduced to a mixing apparatus. Also introduced to the mixing apparatus is a second portion of urea and a plurality of particles comprising the same metal nitrate as in the first portion. The substantially molten mixture, the second portion of urea, and the metal nitrate particles are mixed in the mixing apparatus to form a slurry. At least a portion of the slurry is discharged from the mixing apparatus and conveyed to and deposited in a rotating structure. While in the rotating structure, the fluid medium of the slurry is formed around the metal nitrate particles as a first coating layer, and then is partially cooled to form the granular coated particles. The granular coated particles are then discharged from the rotating structure and allowed to further cool.

According to several embodiments of this process, a portion of the granular coated particles discharged from the rotating structure, and especially undersized and oversized particles (after crushing), can be recycled and dissolved in the substantially molten mixture before being introduced into the mixing apparatus. In addition, another portion of the granular coated particles discharged from the rotating structure, and especially relatively small product-sized particles, can be recycled into the inlet of the rotating structure.

Still another object of the present invention is to provide a cooling and coating drum arrangement adapted for use in the aforementioned process for preparing the granular coated particles. In accordance with the principles of the present invention, this object is obtained by providing a drum arrangement that includes a substantially cylindrical rotatable structure having a longitudinal axis of rotation and an inner surface defining a substantially cylindrical chamber comprising first and second regions in communication and in axial relation with each other. The first region communicates with an inlet portion of the structure constructed and arranged to permit the first region to receive a slurry of noncolloidal metal nitrate particles uniformly dispersed in a fluid medium formulated from at least dissolved urea and molten material and to coat the metal nitrate particles with the mixture of urea and molten material. The second region communicates with an outlet portion constructed and arranged to discharge granular coated particles from the structure.

A plurality of elongated protruding members are circumferentially spaced about at least a portion of the inner surface of the rotatable structure. The elongated protruding members each generally extend longitudinally along the structure to define a length of the member. The elongated protruding members also each have a height that extends in a generally radial direction between a proximal side adjacent the inner surface of the structure and a distal side disposed nearer to the longitudinal axis of the structure than the proximal side. The height of one or more of the protruding members can change in dimension across the length of the members. Further, one or more of the members can be oriented at an oblique angle with respect to a corresponding radius of the structure.

In addition, the drum arrangement can include a feed distribution system, one or more air lances for distributing and cooling the slurry, air circulation devices, retaining rings and walls in the structure, and any combinations thereof.

The principles of the present invention set forth above are applicable to agricultural fertilizers useful for treating various types of agricultural crops, but have particular applicability to the treatment of crops such as wheat, maize, potatoes, vegetables, and fruits.

The granular coated particles of the present invention can be applied to the soil using techniques well known to those skilled in the art.

These and other objects, features, and advantages of the present invention will become apparent from the following detailed description when taken in conjunction with the accompanying drawings which illustrate, by way of example, the principles of the present invention.

BRIEF DESCRIPTION OF THE DRAWINGS

The accompanying drawings illustrate the present invention. In such drawings:

FIG. 6A is a schematic side view, including a partial cut away sectional side view, of a first feed distributor suitable for use in the process illustrated in FIG. 3;

FIG. 6B is a schematic sectional end view of the first feed distributor, taken along line VI—VI of FIG. 6A;

FIG. 7A is a schematic side view, including a partial cut away sectional side view, of a second feed distributor suitable for use in the process illustrated in FIG. 3;

FIG. 7B is a schematic sectional end view of the second feed distributor taken along line VII—VII of FIG. 7A;

DESCRIPTION OF THE PREFERRED EMBODIMENTS

Figure 1:
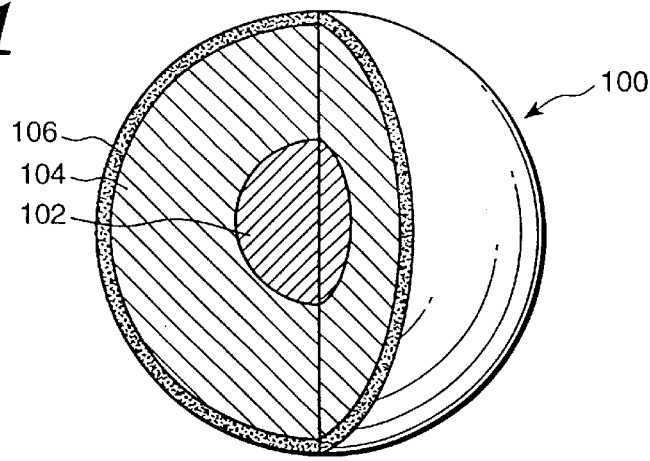
FIG. 1 is a schematic view, including a partially cut-away sectional view, of a granular coated particle according to an embodiment of the present invention.

Referring now more particularly to the drawings, there is shown in FIG. 1 a granular coated particle, generally designated by reference numeral 100. The granular coated particle is suitable for use alone or in combination with other fertilizer particles, both of the coated and non-coated varieties, as an nitrogen-dispersing and/or potassium-dispersing agricultural fertilizer. The particle 100 can be configured to be substantially spherical or in other shapes.

The granular coated particle 100 comprises a particle 102 defining a core portion of the granular coated particle 100. The core particle 102 can be formed from a metal nitrate, preferably sodium nitrate or potassium nitrate. The core particle 102 can be prepared, by way of example and without limitation, from a prill obtained by conventional and well known prilling techniques, or from a granular particle obtained by granulation methods. Although prills are prepared typically from a single chemical compound, such as sodium nitrate or potassium nitrate, the present invention encompasses core particles 102 prepared from prills or granulated particles comprising two or more chemical compounds, such as mixtures of nitrates, so long as one of the chemical compounds is a metal nitrate. For explanatory purposes, the use of prills for forming the core particle 102 will be described herein. It is understood, however, that the scope of the present invention is not so limited.

The core particle 102 of the granular coated particle 100 of the present invention can have a maximum effective diameter, by way of example and is without limitation, in a range of from about 0.8 mm to about 4.0 mm, and more preferably in a range of from about 0.8 mm to about 3.0 mm, and most preferably in a range of from about 1.3 mm to 2.5 mm. As referred to herein, the term "maximum effective diameter" denotes the largest dimension across the particle which would prevent the particle from passing through a screening mesh.

Surrounding the metal nitrate core particle 102 is a first coating layer 104. The first coating layer 104 can be prepared from a mixture containing at least urea and one or more metal nitrates, including the metal nitrate contained in the particle 102 defining the core portion. The first coating layer 104 of the present invention does not serve as a binder for binding particles 102 together as agglomerates; rather, the first coating layer 104 surrounds the core particle 102 so that the granular coated particle 100 contains metal nitrate core particle 102 encased within its first coating layer 104 so as to result in a particle that is substantially free and discrete from other metal nitrate particles.

The metal nitrate compound in the first coating layer 104 is preferably distributed in a substantially uniform manner throughout the urea in the first coating layer 104. As referred to herein, this substantially uniform distribution includes the appearance of a relatively small transition phase interposed between the particle 102 and the first coating layer 104 of the granular coated particle 100. Such transition phase can result from heating the prill used to form the core particle 102 to high temperatures during the preparation of the granular coated particle 100. By pre-heating the prill to a sufficient temperature during preparation of the granular coated particle 100, the peripheral portion of the prill dissolves during preparation and tends to penetrate into the first coating layer 104, thereby reducing the diameter of the prill and contributing a portion of the metal nitrate to the first coating layer 104. The sodium nitrate prills can be preheated, by way of example and without limitation, to a temperature in a range of from about 140° C. to about 230° C., more preferably in a range of from about 150° C. to about 180° C., and most preferably in a range of from about 160° C. to about 170° C. For potassium nitrate, the prills can be preheated, by way of example and without limitation, to a temperature in a range of from about 150° C. to about 240° C., more preferably in a range of from about 175° C. to about 195° C., and most preferably in a range of from about 180° C. to about 190° C. The penetration of metal nitrate from the prill to the first coating layer 104 can also account for a transition phase containing a higher concentration of metal nitrate than in the remainder of the first coating layer 104. Accordingly, the interfacial boundary between the core portion 102 and the peripheral coating layer 104 of the particle 100 can become virtually indistinct to the naked eye.

The concentration of metal nitrate to urea in the granular coated particle 100 can be selected in accordance with the desired application and intended use of the granular coated particle 100. The granular coated particle 100 of the present invention as a whole may contain, by way of example, at least 10% and not greater than about 60% by weight of urea, and more suitably can contain at least 30% and not greater than about 45% by weight of urea. According to one preferred embodiment, the particle 100 contains 30% by weight of urea, which amounts to a nitrogen concentration of about 25.4 wt % for a granular particle having a sodium nitrate core particle and sodium nitrate/urea first coating layer, and a nitrogen concentration of about 23.6% for a granular particle having a potassium nitrate core particle and a potassium nitrate/urea first coating layer.

Figure 2A:
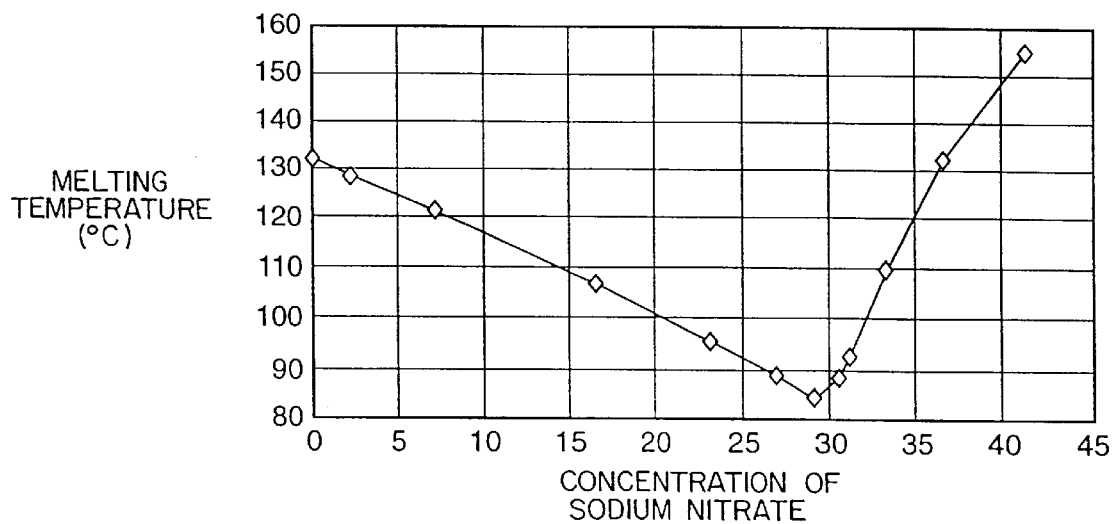
FIG. 2A is a phase transition diagram of urea and sodium nitrate.
Figure 2B:
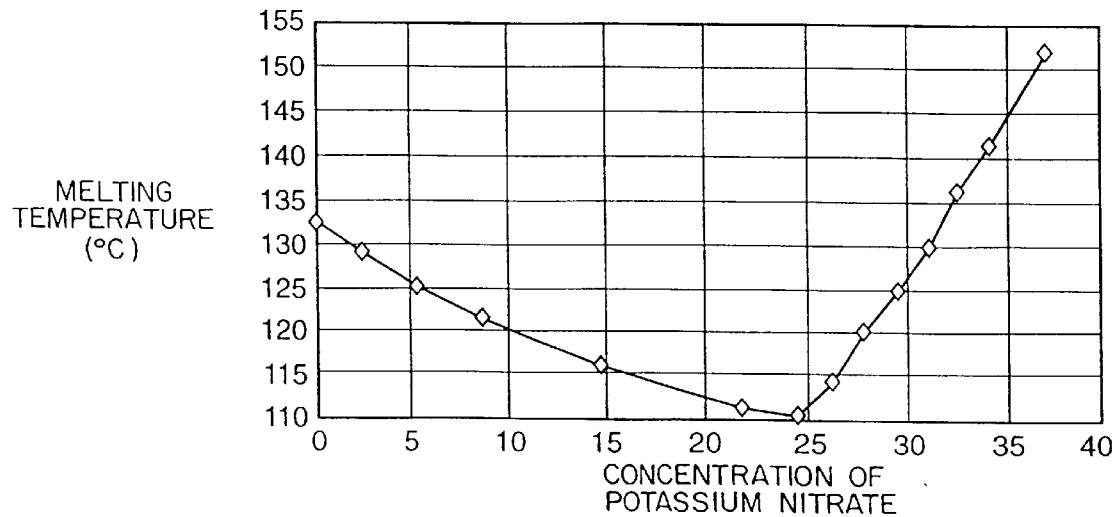
FIG. 2B is a phase transition diagram of urea and potassium -nitrate.

The mixture of urea and metal nitrate in the coating layer 104 has a melting temperature that is lower than the respective melting temperature of the urea and the metal nitrate alone if the mixture is less than about 37 wt % sodium nitrate for a sodium nitrate/urea mixture, or is less than about 32 wt % potassium nitrate for a potassium nitrate/urea mixture. This relationship of melting temperatures is illustrated in the phase diagrams of FIGS. 2A and 2B. Here, the abscissa designates the concentration of sodium nitrate (FIG. 2A) or potassium nitrate (FIG. 2B) relative to urea in weight percent, and the ordinate designates the melting temperature (°C) of the mixture as a function of composition. The lowest melting temperature of the system of urea and sodium nitrate is achieved when the weight ratio of urea to sodium nitrate is about 29:71, whereas the lowest melting temperature of the system of urea and potassium nitrate is achieved when the weight ratio of urea to potassium nitrate is 24:76. This lowest melting temperature is also known as the eutectic temperature of the system.

As referred to herein, a mixture of urea to metal nitrate in the first coating layer 104 of the particle 100 which corresponds to the eutectic temperature of the system is denoted as the eutectic mixture.

Optionally, a second coating layer 106 surrounding part or all of the first coating layer 104 can be provided. Although the second coating layer 106 is not required, its provision is preferred, especially for particles 100 containing sodium nitrate as the metal nitrate due to the high hygroscopicity of the sodium nitrate/urea combination.

The second coating layer 106 can be formed from one or more parting agents suitable to prevent agglomeration and caking of the granular coated particles 100 with each other. Suitable parting agents include, by way of example and without limitation, Kaolin, diatomaceous earth, attapulgite clay, perlite, and lime.

In addition, the first coating layer 104 and/or second coating layer 106 of the granular coated particle 100 can also include, by way of example and without limitation, one or more of the following: essential macronutrient plant growth additives, both primary macronutrients such as nitrogen, potassium, and phosphorus, and secondary macronutrients, such as magnesium, calcium, and sulfur, including sulfur compounds such as calcium sulfate, ammonium sulfate, and aluminum sulfate, and any combination thereof; micronutrient-containing compounds, such as compounds containing zinc, iron, boron, manganese, copper, molybdenum, chlorine, and any combination thereof; anticaking agents adapted to suppress by various means moisture penetration into a collection of stored granular coated particles, such as the sulphonated naphthalene compound Petro-X, E/PE-130/94-2 (manufactured by Hoechst), petrolatums (e.g., vaseline), microcrystalline wax, light to heavy oils, other anticaking agents known in the art, and any combination thereof; and other conventional additives such as cobalt, silicon, and sodium, in any combination. The concentration of anticaking agents in the granular coated particle 100 can be, for example, in a range of about 0.01% to 0.03% by weight. The concentration of magnesium oxide in the granular coated particle 100 can be, for example, 5% or less by weight, and more preferably in a range of from about 1.0% to 3.5% by weight. The concentration of other primary and secondary macronutrients in the granular coated particle 100 each can be, for example, 5.0% or less by weight. The concentration of micronutrients in the granular coated particle 100 can be, for example, 0.1% or less by weight, or even as little as 0.001% by weight. The specific amounts of each additive contained in the granular coated particle 100 is usually selected in accordance with the intended application of the granular coated particle 100.

The granular coated particle 100 of the present invention can have a maximum effective diameter, by way of example and without limitation, in a range of from about 1.0 mm to about 4.5 mm, and more preferably in a range of from about 1.0 mm to about 3.5 mm, and most preferably in a range of from about 1.5 mm to 3.0 mm. The granular coated particle 100 preferably has a sufficiently small size as to allow the granular coated particle of the present invention to be uniformly blended with other commonly commercially available fertilizers, such as diammonium phosphate (DAP), monoammonium phosphate (MAP), granular potassium chloride (KCl), granular potassium sulfate ($K_2SO_4$), granular urea, and others. Such commercially available fertilizers typically have maximum effective diameters of from about 1.0 mm to about 3.5 mm, and more commonly of from about 1.5 mm to about 3.0 mm.

A process for preparing a plurality of the granular coated particles 100 depicted in FIG. 1 in accordance with one embodiment of the present invention will now be explained in detail with reference to FIGS. 3 to 8.

Figure 3:
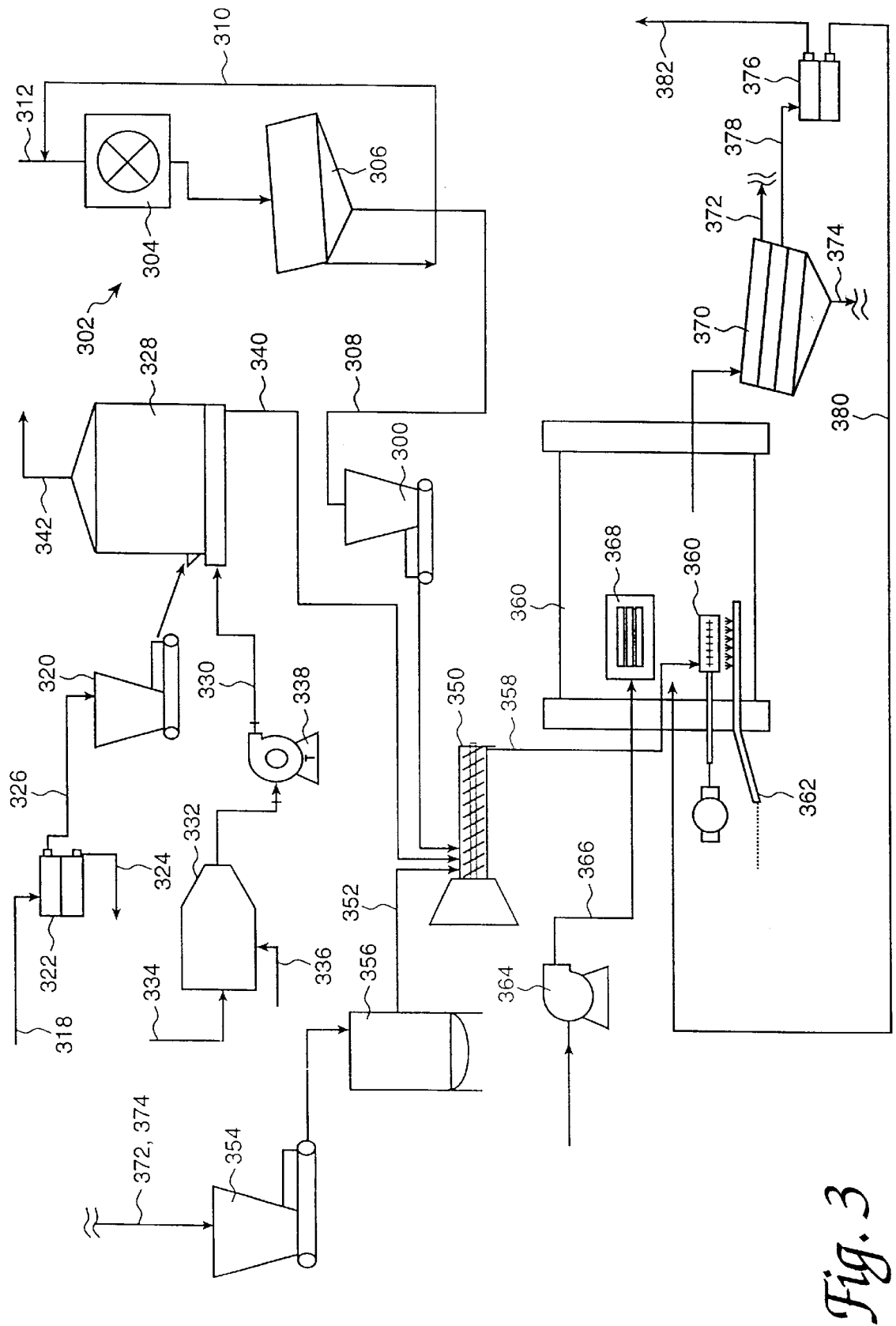
FIG. 3 is a schematic diagram of a process for preparing the granular coated particle depicted in FIG. 1 in accordance with one embodiment of the present invention.

As shown in FIG. 3, the urea employed to prepare the coating layer 104 of the granular coated particle 100 can be introduced into the process via a urea feeder 300. The urea can be introduced in powdered form, or as relatively small particles or prills. Preferably, the urea is introduced in its powder form, since powder is more conducive to efficient melting.

The urea can be obtained from any suitable source. By way of example and without limitation, FIG. 3 illustrates the provision of a urea milling system, generally designated by reference numeral 302, dedicated to providing powdered urea to the urea feeder 300. The urea milling system 302 includes a chain mill 304 for pulverizing urea prills and/or particles received from entrance conduit 312 into a fine powder. The powder and residual prills and/or particles then enter a screener 306, such as a single deck Rotex screener equipped with a Tyler 36 mesh screen. The urea powder and prills and/or particles are agitated in the screener 306 to separate the urea powder from oversized particles and/or prills. The urea powder which is sufficiently small in size to pass through the screener is conveyed to the urea feeder 300 via conduit 308; the separated oversized particles and/or prills can be recycled to the chain mill 304 via conduit 310. The urea powder conveyed to the urea feeder 300 is preferably not more than about 500 μm in maximum effective diameter.

Although not illustrated in FIG. 3, the urea milling system 302 can also be equipped with suction vents and scrubbers installed to reduce urea dust in the atmosphere and thereby improve worker safety. In addition, one or more preheaters (not shown) can be provided upstream or downstream from the urea feeder 300 for preheating the urea powder prior to its introduction into mixer 350.

As further shown in FIG. 3, metal nitrate prills that form the core particles 102 can be introduced into the process via a metal nitrate feeder 320. Although metal nitrate prills are discussed herein, the core particles 102 can also be formed from particles prepared by well known techniques or granulation methods other than prilling. Further, although prills are prepared typically from a single chemical compound, such as sodium nitrate or potassium nitrate, the present invention encompasses particles prepared from prills or granulated particles comprising two or more chemical compounds, such as mixture of nitrates, so long as one of the chemical compounds is a metal nitrate. The metal nitrate prills introduced into the process (after screening) can have, by way of example and without limitation, a maximum effective diameter in a range of from about 1.2 mm to about 4.3 mm, and more preferably in a range of from about 1.2 mm to about 3.2 mm, and most preferably in a range of from about 1.5 to 2.7 mm. The prills can be configured in spherical or other shapes. A sodium nitrate prill having a crush strength in a range of, for example, from about 2.7 lbs to about 3.85 lbs, and more typically of about 3.16 lbs, can be employed.

By way of example and without limitation, FIG. 3 illustrates prescreening of the metal nitrate prills in a screener 322, such as a rotoball screener equipped with a 1.3 mm opening screen, which agitates the metal nitrate prills to separate and remove undersized prills via conduit 324. The prills sufficiently large in size so as not to pass through the screener 322 can be introduced to the metal nitrate feeder 320 via conduit 326.

From the metal nitrate feeder 320, the prills can be preheated by passing the prills through a preheater such as, by way of example and without limitation, a fluidized bed 328. A high temperature air stream 330 passed through the fluidized bed 328 can be generated by drawing ambient air and natural gas into a combustion chamber 332 via conduits 334 and 336, respectively, and combusting the natural gas to heat the air. The resulting high temperature gas stream 330 exiting the combustion chamber is transferred from the combustion chamber 332 to the fluidized bed 328 via a pressure blower 338. The high temperature gas stream 330 is then contacted with the prills passing through the bed 328 to effect heat transfer therebetween. The temperature of the prills discharged from the fluidized bed 328 via conduit 340 is preferably in a range of from about 140° C. to about 230° C., more preferably in a range of from about 150° C. to about 180° C., and most preferably in a range of from about 160° C. to about 170° C. when sodium nitrate is selected as the metal nitrate. For potassium nitrate, the prills discharged from the fluidized bed via conduit 340 preferably have a temperature in a range of from about 150° C. to about 240° C., more preferably in a range of from about 175° C. to about 195° C., and most preferably in a range of from about 180° C. to about 190° C. The gas stream 330 exiting the fluidized bed 328 via conduit 342 can be passed through a pollution control device (not shown) to remove particulates and any undesirable gases and ensure compliance with environmental and worker health and safety regulations.

It is understood that other conventional and nonconventional devices, both batch and continuous flow, can be substituted for any one or more of the above-discussed fluidized bed 328, combustion chamber 332, pressure blower 338, and/or pollution control device for preheating the metal nitrate prills.

The urea powder and the metal nitrate prills are thereafter conveyed from the feeders 300 and 320, respectively, to mixer 350. Also passed to the mixer 350 is a molten flow stream 352 containing at least urea and at least one metal nitrate, so long as one of the metal nitrates in the molten flow stream is the same as the metal nitrate introduced via the feeder 320.

According to the embodiment illustrated in FIG. 3, the molten flow stream 352 is prepared from recycled and/or defective (e.g., oversized, undersized, chipped) product, in which case the molten flow stream 352 is introduced to the mixer 350 with a recycle feeder 354. The use of recycled and/or defective product for preparing the molten flow stream 352 is advantageous insofar as conserving raw materials and minimizing waste, which improves the efficiency and economics of the overall process. However, the molten flow stream 352 is not so limited; rather, the molten flow stream 352 can be prepared, for example, in part or in whole from virgin urea and/or metal nitrate feed.

Interposed between the mixer 350 and the recycle feeder 354 is a melter 356 for heating the recycled product and forming the molten flow stream 352. The melter 356 operates at a sufficiently high temperature to dissolve into a liquid state essentially all, if not all, of the urea and metal nitrate in the melter 356 to form the molten flow stream 352. Complete or substantially complete dissolving of the urea and metal nitrate into the liquid state is essential for avoiding agglomeration of the metal nitrate prills in the granulated particle 100, such that the resultant metal nitrate core particles 102 are each substantially free and discrete from one another. By avoiding agglomeration of the metal nitrate prills, the resultant granular coated particles 100 are much more apt to undertake a spherical configuration.

The slurry is also preferably maintained in a substantially anhydrous state throughout the production process. Substantially anhydrous as referred to herein includes a water concentration sufficiently low to provide the resulting granular coated particles 100 with a relatively high crush strength. Preferably, the water concentration in the substantially anhydrous slurry is maintained at not more than about 1% by weight of the slurry, more preferably not more than about 0.4% by weight of the slurry, and most preferably not more than about 0.1% by weight of the slurry.

Although the melter 356 can be of any suitable design and contain any suitable instrumentations, according to one embodiment, the melter 356 is equipped with a steam jacket (not shown) and multiple impellers (not shown), and has a dish-type bottom and baffles (not shown) to aid in circulation and mixing of the urea and metal nitrate. The melter 356 can also receive recycle product from the recycle feeder 354 via a top feed port, and have an overhead discharge for expelling the molten flow stream 352. The baffles can terminate about 6 inches below the discharge to create a sufficient vortex within the melter 356 to suppress urea crusting.

Exemplary temperatures to which the urea and sodium nitrate are heated in the melter 356 include temperatures ranging from about 115° C. to about 130° C., and more preferably about 122° C. Where potassium nitrate is used instead of sodium nitrate, the potassium nitrate and urea can be heated in the melter 356 to temperatures ranging, for example, from about 140° C. to about 155° C.

The weight ratio of urea from the feeder 300 to metal nitrate prills from the feeder 320 generally can be, by way of example and without limitation, in a range of from about 1:9 to about 3:2. The weight ratio of the molten flow stream 352 to the combined weight of the urea and metal nitrate prills from the feeders 300 and 320 can be, by way of example and without limitation, in a range of from about 1:10 to about 1:40. The weight ratio of urea to metal nitrate in the molten flow stream 352 can be, by way of example and without limitation, in a range of from about 2:1 to about 3:1.

The mixer 350 is preferably a progressive mixer in which the overall flow through material is continuously passed in a direction from the inlet to the outlet of the progressive mixer. According to one preferred embodiment of the present invention, the mixer is represented by a pug mill apparatus, an example of which is shown in FIGS. 4A to 4C and generally designated by reference numeral 400.

Figure 4A:
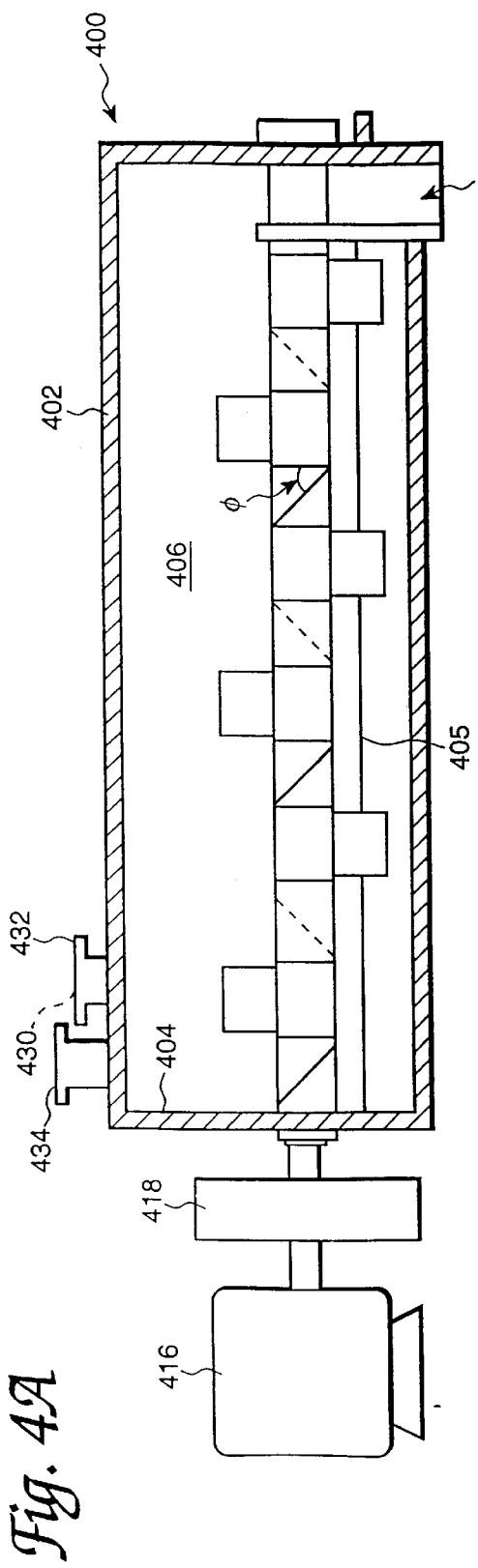
FIG. 4A is a schematic elevational side view of a pug mill apparatus suitable for use in the process illustrated in FIG. 3.
Figure 4B:
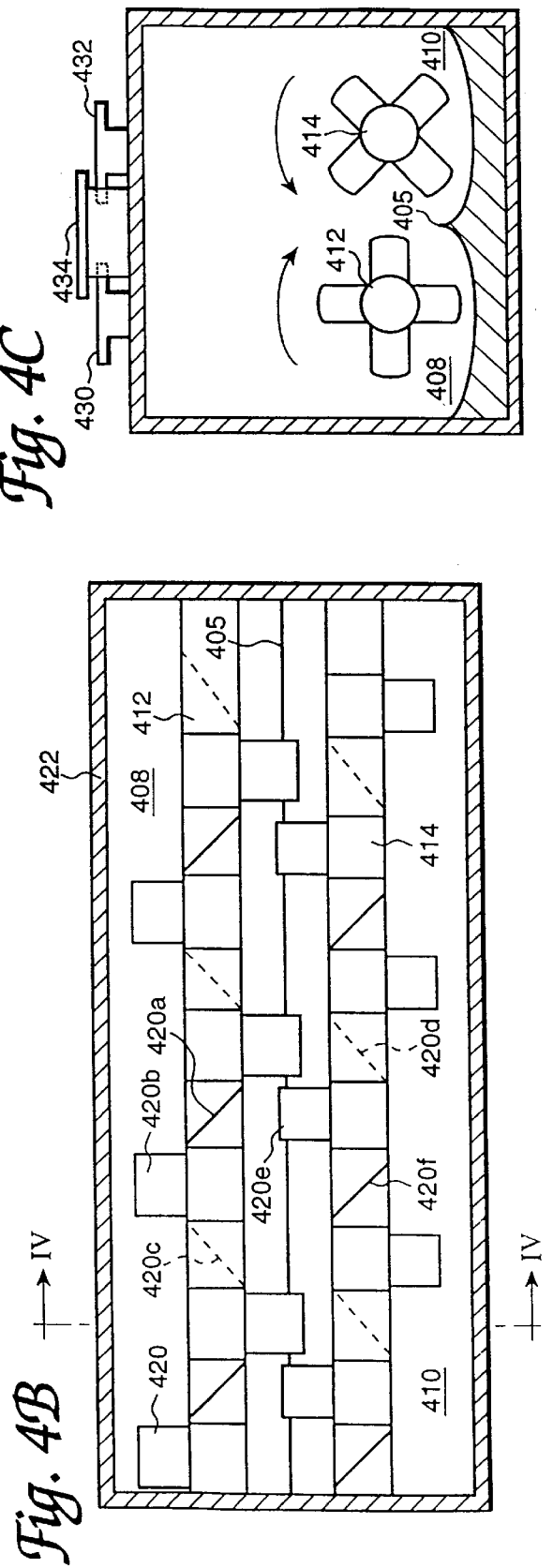
FIG. 4B is a schematic, sectional plan view of part of the pug mill apparatus of FIG. 4A.
Figure 4C:
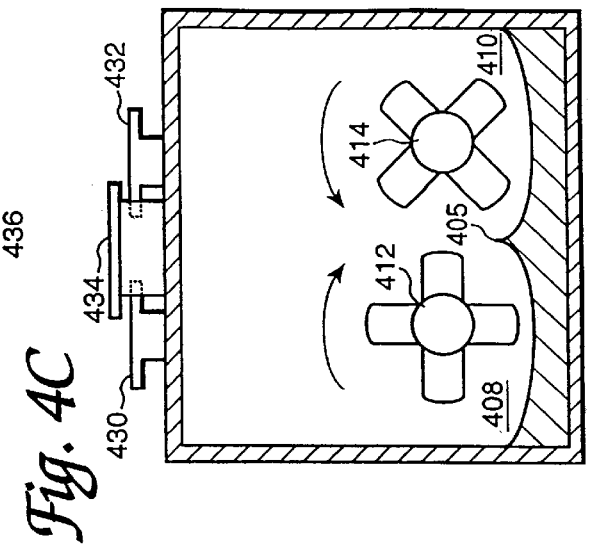
FIG. 4C is a schematic sectional end view of part of the plug mill apparatus of FIG. 4A taken along line IV—IV of FIG. 4B.

As shown in FIGS. 4A to 4C, the pug mill apparatus 400 includes a receptacle 402 having an inner surface 404 defining an elongated cavity, generally designated by reference numeral 406. The lower portion of the inner surface 404 is configured to define an inverted substantially V-shaped ridge 405 (most noticeable in FIG. 4C) longitudinally extending along or near the middle of the cavity 406 so as to section the cavity 406 into a first trough and a second-trough, which are generally designated by reference numerals 408 and 410, respectively.

The first and second troughs 408 and 410 contain first and second rotatable shafts 412 and 414, respectively, longitudinally extending therethrough. The first and second rotatable shafts 412 and 414 are disposed in parallel and horizontally coplanar relation to each other. A motor 416 and torque conveying mechanism 418 (FIG. 4A) are operatively associated with the rotatable shafts 412 and 414 via a conventional arrangement for imparting rotational movement to the shafts 412 and 414.

The shafts 412 and 414 each contains a plurality of paddles 420 radially extending from an outer surface of its associated shaft 412 or 414 and having opposing, substantially rectangular shaped surfaces (unnumbered) with tapered distal ends (unnumbered). The radial length of the paddles is of sufficient dimension that the paddles 420 of the first and second shafts 412 and 414 intersect an imaginary vertical plane extending from the V-shaped ridge 405 over a portion of the path of revolution in which the paddles 420 travel during rotation of the shafts 412 and 414. However, the radial length of any of the paddles 420 is not so great that any of the paddles 420 comes into contact with its non-associated shaft 412 or 414 during rotation.

In the illustrated embodiment, the paddles 420 are axially spaced from one another along the longitudinal length of their respective shafts 412 and 414, and are located about different circumferential positions of their respective shafts 412 and 414. As especially shown in FIG. 4B, the circumferential position of any paddle 420*b* of the first shaft 412 is offset from its downstream longitudinally-adjacent paddle 420*a* and its upstream longitudinally-adjacent paddle 420*c* by 90 degrees and 270 degrees, respectively (in reference to a clockwise direction when viewed along the line of sight indicated by cross-sectional line IV—IV), with paddles 420a and 420c being circumferentially offset by an angle of 180 degrees. Consequently, the paddles 420, radially extending from the first shaft 412, are arranged in a helical pattern thereabout. The circumferential position of any paddle 420e of the second shaft 414 is offset from its downstream longitudinally-adjacent paddle 420d and its upstream longitudinally-adjacent paddle 420f by 270 degrees and 90 degrees, respectively (again in reference to a clockwise direction when viewed along the line of sight indicated by cross-sectional line IV—IV), with paddles 420d and 420f being circumferentially offset by an angle of 180 degrees. Consequently, the paddles 420 radially extending from the second shaft 414 are arranged in a helical pattern about the second shaft 414 that is configured in an opposite rotational direction relative to the helical pattern of the paddles 420 of the first shaft 412.

The surface portions of each of the paddles 420 are oriented at angle θ relative to an imaginary plane arranged transverse to the longitudinal axis of the shafts 412 and 414. In FIG. 4A, this imaginary plane (not shown) is parallel with the vertically-extending surface of an end 422 of the receptacle 402. For each of the first and second shafts 412 and 414, the paddles 420 are arranged so that the orientations of axially-adjacent paddles 420 alternate between the 45 degree angle position and the 135 degree angle position.

As further shown in FIG. 4B, each paddle 420 of the first shaft 412 has a corresponding paddle located at the same longitudinal position of the second shaft 414. The circumferential position of any paddle 420 of the first shaft 412 is different from the circumferential position of its corresponding paddle 420 of the second shaft 414, so that the paddles of the first shaft 412 do not come into direct physical contact with the paddles of the second shaft 414 during operation of the pug mill apparatus 400.

In operation, the urea and the preheated prills are received from the feeders 300 and 320, respectively, by solid inlet ports 430 and 432 (FIG. 4C), respectively. The molten flow stream 352 can be received in a separate molten flow stream inlet port 434. As shown in FIG. 4A, inlet ports 430 and 432 can be located at the same position along the length of the receptacle 402. The inlet port 434 is preferably located upstream from both the urea and metal nitrate inlet ports 430 and 432 for reasons explained below.

After the urea, preheated metal nitrate prills, and substantially anhydrous molten material are received in the cavity 406 of the pug mill apparatus 400, the orientations and operational movement of the paddles 420 serve to mix these constituents together while providing an overall forward drive to the flow of the constituents. Consequently, a slurry comprising noncolloidal metal nitrate prills uniformly dispersed in a fluid medium comprising the dissolved urea and molten material is produced.

According to one preferred embodiment, the urea received from inlet port 430 is partially or completely dissolved into the fluid medium of the slurry while in the receptacle 402 by heat transferred from the preheated metal nitrate prills received from the inlet port 432. This heat also serves to partially dissolve the metal nitrate particles received from the inlet port 432 into a liquid state, thereby slightly reducing the volume of the metal nitrate prills as an outer portions of the metal nitrate prills are dispersed into the molten mixture. In this embodiment, the molten material received from inlet port 434 serves to provide a heat-transfer medium for transferring heat from the preheated metal nitrate prills to the urea. Alternatively, the heat employed to dissolve the urea received from inlet port 430 can be provided in whole or in part from the molten material received via inlet port 434. The pug mill 400 can also be provided with heating and/or cooling devices (not shown), such as a steam jacket, for dissolving the urea and metal nitrate particles, or for maintaining a suitable operating temperature in the cavity 406 of the receptacle 402.

By locating the molten flow stream inlet port 434 upstream from both the urea inlet port 430 and metal nitrate inlet port 432, the urea and metal nitrate prills received from inlet ports 430 and 432 are immediately received in the molten material, and efficiency of the molten material as a heat-transfer medium is improved.

The mixing efficiency achieved by the paddles can be improved by rotating the first and second shafts 412 and 414 in opposite directions with respect to each other, as shown in FIG. 4C. The opposing rotational directions of the first and second shafts 412 and 414 serves to drive the slurry towards the central V-shaped ridge 405 of the receptacle 402, where the mixing action is greatest. A non-limiting example of a suitable shaft speed for achieving adequate mixing is 192 rpm, which produces a paddle tip speed of about 327 feet per minute (fpm). The mixing efficiency produced by the opposing rotational directions of the shafts 412 and 414 can be augmented by the provision of the above-discussed alternating paddle orientations between the 45 degree angle position and the 135 degree angle position, which imparts a forward drive of the slurry at one paddle that is met by a reverse drive at the downstream, longitudinally-adjacent paddle.

The efficiency and performance of the pug mill apparatus 400 further can be improved by controlling the depth of the slurry contained in the apparatus 400 so that the slurry is maintained below the maximum operational height reached by the paddles 420.

Finally, the slurry spills over a retaining wall 438 and is removed from the pug mill apparatus 400 through outlet port 436 disposed at or near the downstream end of the pug mill apparatus 400.

After exiting the mixer 350 via an outlet port, such as the outlet port 436 of the pug mill apparatus 400, the slurry is conveyed via conduit 358 to a cooling and coating apparatus 360.

Figure 5A:
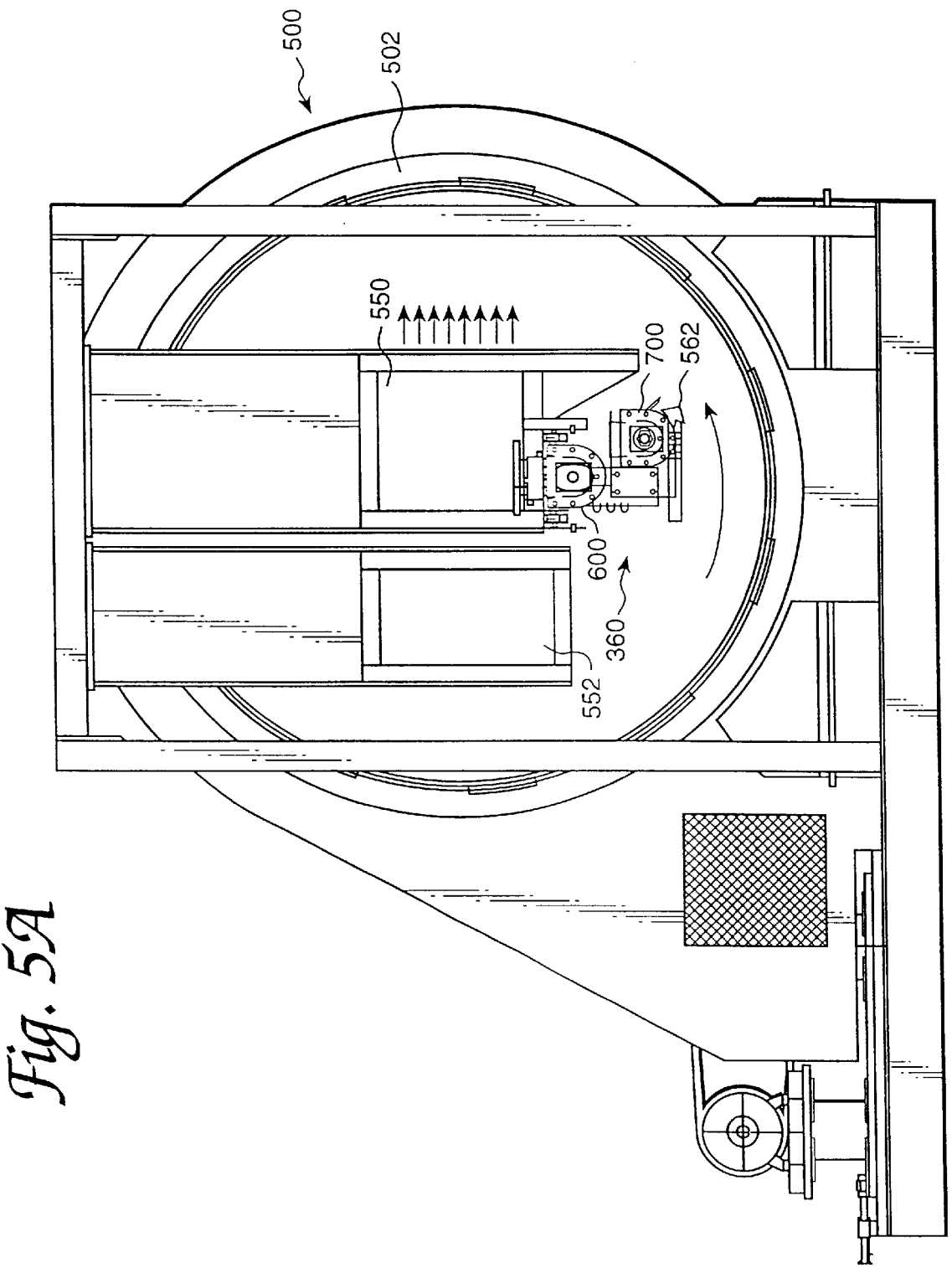
FIG. 5A is an schematic elevational end view of a coating and cooling drum arrangement suitable for use in the process illustrated in FIG. 3.
Figure 5B:
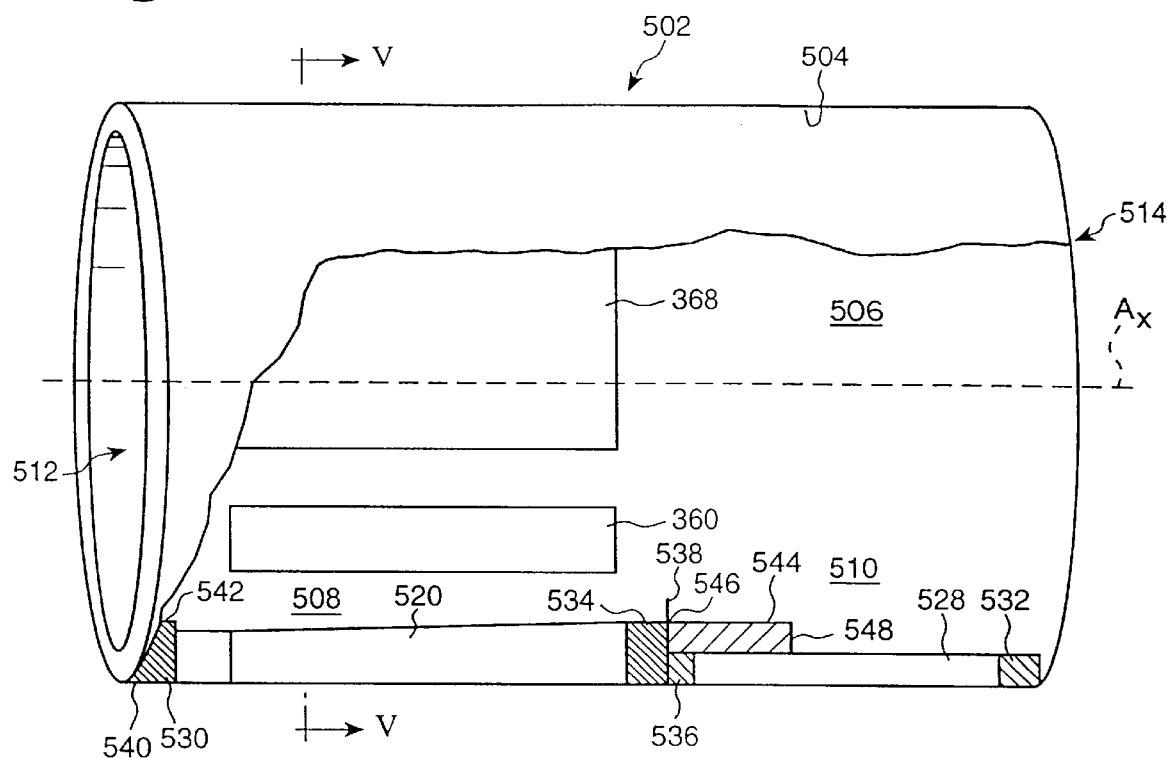
FIG. 5B is a schematic side view, including a partial cut-away sectional side view, of the drum arrangement of FIG. 5A.
Figure 5C:
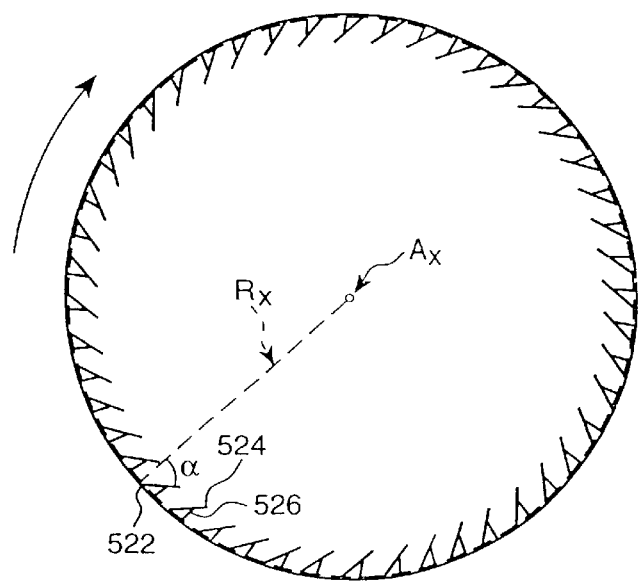
FIG. 5C is a schematic sectional end view of a rotatable structure suitable for use in the drum arrangement of FIG. 5A, the sectional end view being taken along line V—V of FIG. 5B.

According to one preferred embodiment of the present invention, the cooling and coating apparatus 360 is represented by a drum arrangement as illustrated in FIGS. 5A to 5C and generally designated by reference numeral 500.

As shown in FIGS. 5A to 5C, the drum arrangement 500 comprises a substantially cylindrical structure 502 rotatable about a longitudinal axis $A_x$ and having an inner surface 504 defining a substantially cylindrical chamber 506 therein. The chamber 506 comprises a first region 508 and second region 510 in communication with each other, with the second region 510 being disposed axially downstream from the first region 508. The upstream end (unnumbered) of the first region 508 is in communication with an inlet portion 512 of the structure 502. On the other hand, the downstream end (unnumbered) of the second region 510 is in communication with an outlet portion 514 of the structure 502.

A plurality of first elongated lifting flights (also referred to herein as elongated protruding members) 520 are spaced circumferentially about at least a portion of the first region 508 of the rotatable structure 502, as shown in FIG. 5C. The first elongated lifting flights 520 each extends in a generally longitudinal direction with respect to the structure 502 so as to define a length of the first lifting flight 520. As referred to herein, generally longitudinal direction means both a direction in which the first lifting flights 520 are in parallel relation with the longitudinal axis $A_x$ of the structure 502, and a direction in which the first lifting flights 520 are offset at a slight oblique angle from the longitudinal axis $A_x$. Preferably, this oblique angle is not more than about 20 degrees, and more preferably not more than about 5 degrees. In the most preferred embodiment shown in FIGS. 5A to 5C, the first elongated lifting flights are in parallel relation with the longitudinal axis $A_x$.

The first elongated lifting flights 520 also extend in a generally radial direction between a proximal side 522 (FIG. 5C) adjacent the inner surface 504 of the structure 502 and a distal side 524 (FIG. 5C) disposed nearer to the longitudinal axis $A_x$ of the structure 502 than the proximal side 524 so as to define a height of the lifting flight 520. Although not shown, the proximal side 524 of one or more of the first elongated lifting flights 520 can be slightly spaced from the inner surface 504 of the structure 502.

As further illustrated in FIG. 5C, each of the first elongated lifting flights 520 is associated with a corresponding radius $R_x$ defined between the longitudinal axis $A_x$ of the structure 520 and the proximal side 524 of the lifting flight 520. As shown in the illustrated embodiment, one or more of the generally radially-extending first lifting flights 520 can be angled with respect to its corresponding radius $R_x$ by an oblique angle α so that the distal side 524 of the lifting flight 520 lags behind the proximal side 522 with respect to a direction of rotation of the rotatable structure, which is generally designated by the arrow in FIG. 5C. This oblique angle a is preferably in a range of from about 20 degrees to about 70 degrees, more preferably in a range of from about 40 degrees to about 50 degrees, and most preferably 45 degrees. Alternatively, although not shown in the drawings, one or more of the generally radially-extending first elongated lifting flights 520 can be parallel with its corresponding radius $R_x$.

Where the first elongated lifting flights 520 are arranged at an oblique angle as described above, the lifting flights 520 can be equipped with respective reinforcing members 526 (FIG. 5C) extending between the inner surface 504 of the structure 502 and the surface (unnumbered) of the lifting flight 520 defining an acute angle (when viewed in cross-section, as in FIG. 5C) with the inner surface 504. These reinforcing members can also serve to inhibit granular particles from becoming trapped between the lifting flight 520 and the inner surface 504 of the rotatable structure 502.

As shown in FIG. 5E, the height of one or more of the first elongated lifting flights 520 can increase across the length of the lifting flight 520, so that the height of the lifting flight 520 at an end disposed closer to the inlet portion 512 is less than the height of the same lifting flight 520 at an end disposed closer to the second region 510. The increase in height of any first elongated lifting flight 520 can be continuous across the entire length of the lifting flight 520, or discontinuous such that the height only increases over a portion or spaced portions of the lifting flight 520.

The second region 510 can include second elongated lifting flights 528 each extending in a generally longitudinal direction through at least a portion of the second region 510. The second elongated flights 528 can be separate from or integrally connected with the first elongated lifting flights 520. Further, the second elongated lifting flights 528 can be arranged in the same or different circumferentially spaced relation to each other as the first elongated lifting flights 520. Furthermore, the second elongated flights 528 can have the same or different dimensions, and can be arranged in the same or different orientations than the first elongated lifting flights 520.

One or more annular retaining walls can be arranged throughout the chamber 506 of the structure 502. For example, as shown in FIG. 5B, a first annular retaining wall 530 is disposed in the first region 508 adjacent the inlet portion 512, and a second annular retaining wall 532 is disposed in the second region 510 adjacent the outlet portion 514 of the structure 502. Also shown are third and fourth annular retaining walls 534 and 536 positioned in the first and second regions 508 and 510, respectively, so as to abut an interfacial boundary intermediate the first and second regions 508 and 510. A retaining ring 538 is interposed between the third and fourth annular retaining walls 534 and 536. Each of the annular retaining walls 530, 532, 534, and 536 is arranged to extend in a generally radial direction between a proximal end 540 (designated on retaining wall 530 only) contiguous with the inner surface 504 of the structure 502 and a distal end 542 (also designated on retaining wall 530 only) positioned nearer to the longitudinal axis $A_x$ than the proximal end 540.

The second region 510 of the rotatable structure 502 can further include third elongated flights 544. According to one embodiment, each of the third elongated flights 544 is formed directly on the upper surface (unnumbered) of the fourth retaining wall 536 and a segment of one or more of the second lifting flights 528. The third elongated flights 544 each extends along its length between an end 546 proximal to the retaining ring 538, and an end 548 distal relative to the retaining ring 538. The proximal end 546 of each of the third elongated flights 544 can be associated with an end of a corresponding second lifting flight 528. Each third elongated flight 544 is arranged with respect to the longitudinal axis $A_x$ of the structure 502 so as to define an angle between the length of any of the third elongated flights 544 and the retaining ring 538. This angle should be set to suppress the backflow of particles from the second region 510 and into the first region 508. This angle can be, for example and without limitation, in a range of from about 30 degrees to about 60 degrees, and more preferably about 45 degrees, so that the distal end 548 of any of the third flights 544 lags behind its proximal end 546 with respect to a direction of rotation of the rotatable structure 502.

As shown in FIG. 5A, a feed distribution system, generally designated by reference numeral 360, is at least partially accommodated within the first region 508 of the chamber 506. This embodiment is collectively represented by a first feed distributor illustrated in FIGS. 6A and 6B and generally designated by reference numeral 600 and a second feed distributor illustrated in FIGS. 7A and 7B and generally designated by reference numeral 700.

As shown in FIGS. 6A and 6B, the first feed distributor 600 comprises a trough 602 defined by first and second elongated side portions 604 and 606 and a bottom portion 608, each integrally connected to each other and terminating in respective ends 610 and 612 (FIG. 6A). The trough 602 is oriented in a generally parallel relationship with the longitudinal axis $A_x$ of the rotatable structure 502. A feed inlet 630 can be positioned proximal to the inlet portion 512 of the structure 502 and the end 610 of the first feed distributor 600 as shown in FIGS. 6A or 6B, or alternatively can be positioned proximal to the center of the structure 502 near the retaining ring 538. The feed inlet 630 is operatively associated with the conduit 358 (FIG. 3).

The trough 602 (FIG. 6B) defines an exposed cavity 614 therein. A plurality of substantially V-shaped weirs 616 are formed in the elongated side portion 606 in spaced and substantially coplanar relation to each other to define outlet passages in communication with the cavity 614.

A rotatable shaft 618 oriented in a generally parallel direction in relation to the longitudinal axis $A_x$ is received within the cavity 614. Extending radially from the outer surface (unnumbered) of the rotatable shaft 618 is a helical conveyer 620, which traverses a substantial portion of the axial length of the rotatable shaft 618. The width (i.e., as measured in the radial direction with respect to the shaft 618) of the helical conveyer 620 can decrease over the axial length of the shaft 618, such that the width of the helical conveyer 620 at the end 610 associated with feed inlet 630 is greater than the width of the helical conveyer 620 associated with the opposing end 612 of the trough 602. In a preferred embodiment, this radial width decreases in a step-wise manner, with the axial positions at which the decreases in dimension occur each corresponding to the location of one of the weirs 616.

A plurality of mixing paddles 622 extending in a generally radial direction from the rotatable shaft 618 is also provided. The mixing paddles 622 can be spaced circumferentially and longitudinally about the rotatable shaft 618 in prearranged patterns or randomly dispersed. If desired, the mixing paddles 622 can define simple configurations, such as elongated cylindrical rods having uniform outer diameters across their length.

Disposed below the weirs 616 of the first feed distributor 600 and at least partially accommodated within the first region 508 of the chamber 506 is the second feed distributor 700.

As shown in FIGS. 7A and 7B, the second feed distributor 700 comprises a trough 702 defined by first and second elongated side portions 704 and 706 and a bottom portion 708, each integrally connected and oriented in a generally parallel relationship with the longitudinal axis AX of the rotatable structure 502 and terminating in respective ends 710 and 712 (FIG. 7A).

The trough 702 (FIG. 7B) defines an exposed cavity 714 therein. A rotatable shaft 718 oriented in a generally parallel direction in relation to the longitudinal axis $A_x$ of the rotatable structure 502 is received within the cavity 714. Extending radially from the outer surface (unnumbered) of the rotatable shaft 718 is a plurality of mixing paddles 722. The mixing paddles 722 can be spaced circumferentially and longitudinally about the rotatable shaft 718 in various prearranged patterns, or can be randomly dispersed. If desired, the mixing paddles 722 can exhibit simple configurations, such as an elongated cylindrical rod having a uniform outer diameter across the length thereof, or more intricate configurations.

A slanted chute 724 (FIG. 7B) is arranged in operative association with the second feed distributor 700 to receive and distribute feed material discharged from the second feed distributor 700. As shown in the illustrated embodiment, the slanted chute 724 is connected to the upper edge 706a of the second elongated side portion 706.

At least partially accommodated within the first region 508 of the chamber 506 is an air lance 562. An embodiment of this arrangement is illustrated in FIGS. 8A and 8B and generally designated by reference numeral 800.

Figure 8A:
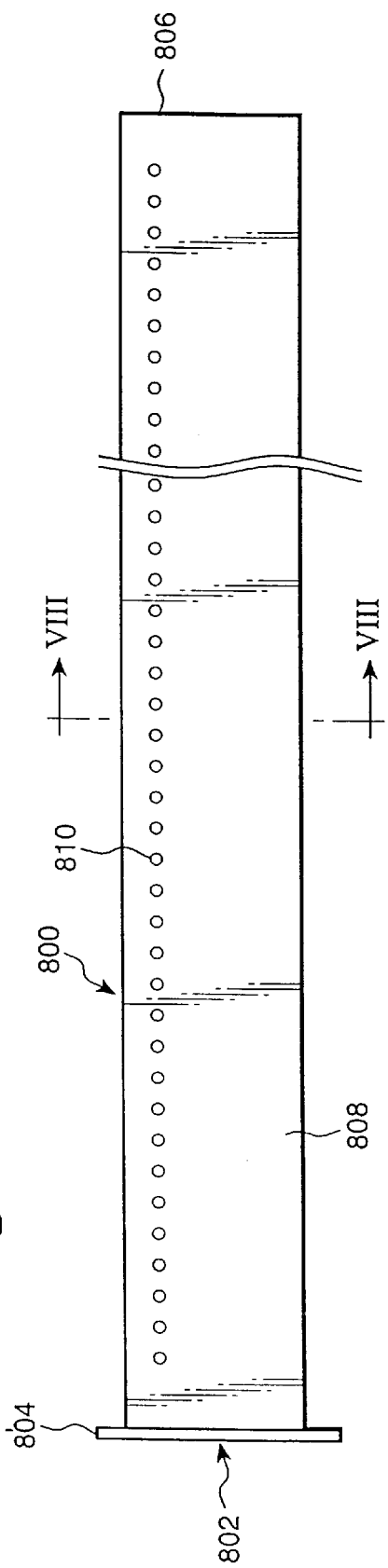
FIG. 8A is a schematic elevational side view of an air lance suitable for use in the process illustrated in FIG. 3.
Figure 8B:
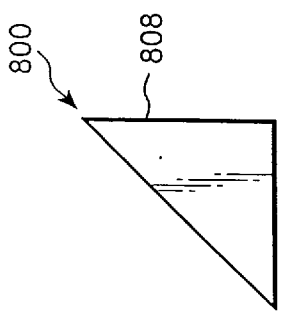
FIG. 8B is a schematic sectional end view of the air lance taken along line VIII—VIII of FIG. 8A.

As illustrated in FIGS. 8A and 8B, the air lance 800 can be defined by an elongated, hollow body having a triangular cross-section. An opening, generally designated by reference numeral 802, is provided at one end 804 of the air lance 800, whereas the opposing end 806 is closed. The open end 804 is operatively associated with a pressurized air generating device (not shown) for receiving pressurized air from the air generating device. At least one side surface 808 of the air lance 800 contains relatively small apertures 810 arranged in coplanar relationship and oriented to emit a substantially horizontally-directed stream of pressurized air.

Also disposed within the chamber 506 of the rotatable structure 502 is a cooling system, generally designated in FIG. 3 by reference numeral 368. The cooling system 368 can include a cooling medium discharge header 550 and a cooling medium collecting header 552, which are constructed and arranged with respect to each other to permit a cooling medium such as air to enter into, circulate about, and exit from the rotatable structure 502. The cooling medium can be supplied, for example, from a blower 364 (FIG. 3) communicating with header 550 via conduit 366 (FIG. 3). The discharge of cooling medium from the cooling medium discharge header 550 and into the chamber 506 is depicted by the series of arrows adjacent header 550.

In operation, the slurry comprising the metal nitrate prills dispersed in the urea/metal nitrate medium is conveyed via conduit 358 to the feed inlet 630 of the first feed distributor 600. The slurry enters the first feed distributor 600 and is metered along the axial length of the first feed distributor by the helical conveyer 620. The mixing paddles 622 serve to mix the slurry while driving the slurry towards the substantially V-shaped weirs 616, through which the slurry exits the first feed distributor 600. The weirs 616 should be sufficiently large in dimension to permit agglomerations of prills that may have formed upstream (for example, in the pug mill apparatus 400) to exit the first feed distributor 600 without damming and obstructing the flow path through the distributor 600.

In order to ensure that the slurry is metered uniformly along the axial length of the first feed distributor 600 so that a substantially equal amount of slurry is discharged from each weir 616, the radial width of the conveyer 620 preferably decreases in a step-wise manner as described above. Further, the rotational velocity of the rotatable shaft 618 can be varied proportionally with the flow rate of slurry entering the first feed distributor 600 to further ensure a uniform distribution of slurry from the weirs 616.

The slurry discharged through the weirs 616 of the first feed distributor 600 pours into the exposed cavity 714 of the second feed distributor is 700 located therebelow. The plurality of mixing paddles 722 extending from the rotating shaft 718 serve to level and mix the slurry within the trough 702. As the slurry overfills the trough 702, the slurry flows over the upper edge 706a of the second elongated side portion 706 of the trough 702 and pours down the slanted chute 724. In operation, the slanted chute 724 should be oriented at such an angle so as to provide laminar flow of slurry across the surface of the slanted chute 724, thereby substantially avoiding turbulent flow and/or the formation of rivulets in the slurry. The distribution systems also should he arranged to allow the laminar flow of slurry to be distributed uniformly across the face of the chute 724.

Although not shown, the distributors 600 and 700 each preferably include a steam jacket or other heat exchanging device to maintain the urea/metal nitrate medium in a molten state and facilitate the flow of slurry through the feed distribution system.

The feed distribution system described in the foregoing embodiment is designed to furnish a slurry that is substantially uniform in composition and temperature and laminar in flow, thereby avoiding the presence of hot spots and agglomerations of prills. Although the use of two feed distributors has been described in the foregoing embodiment to achieve these objectives, it is understood that one feed distributor or more than two feed distributors, or feed distributors having different designs can be employed as well.

After the laminar flow of slurry has traversed the slanted chute 724, gravitational force redirects the slurry in a substantially vertical downward direction to define a falling curtain of slurry. The gravitational force directs the falling curtain of slurry towards the inner surface 504 of the rotating structure 502, which (after start-up) already contains a rolling bed of material that previously had been deposited from the feed distribution system 360 or via a recycle stream (discussed below). The rolling bed includes previously-deposited slurry, as well as partially-coated and completely-coated granular particles 100 formed in or recycled to the rotating structure 502.

Pressurized air (or other gas medium) expelled from the air lance 800 intercepts the falling curtain of slurry prior to the slurry reaching the rolling bed and deflects the falling curtain of slurry from its substantially vertical downward path and into an outward, non-vertical direction. The intercepted falling curtain of slurry thereby is deposited on a rolling bed over a relatively larger surface area than if the slurry had not been intercepted by the pressurized air. The air lance 800 can be operated and arranged relative to the substantially vertical downward path of the slurry so that the pressurized air expelled from the air lance 800 serves to facilitate the separation of the prills in the slurry from each other prior to the slurry being deposited on the rolling bed.

As the slurry is continuously deposited on the rolling bed of material, the rolling bed is continuously displaced by the rotational movement of the structure. For example, after a random portion of slurry is deposited on the bed, the segment of the bed containing the random portion of slurry is elevated by the rotational movement of the structure 502. The first lifting flight 520 retains this segment of the bed through a portion of its ascent. After the generally radially-extending surface of the first lifting flight 520 surpasses both a horizontal orientation and a position at which the gravitational force acting on the bed portion is greater than the centrifugal force acting on the bed portion, the bed segment is released from the first lifting flight 520. The bed portion thereafter cascades towards the lowest portion of the structure 502 as the particles contained in the cascading bed portion are rolled and thereby coated with the medium of the slurry. These cascading and rolling motions are repeated by successive first lifting flights 520.

The cascading and rolling motions in the rolling bed serve to surround the metal nitrate core particle 102 with the coating layer 104, thereby forming the granular coated particles 100. These cascading and rolling motions also serve to facilitate the conveyance of substantially spherical configurations to the granular coated particles 100.

The formation of the granular coated particles 100 in the rolling bed can be influenced by several operational parameters. For example, rotational speed of the structure 502 affects the centrifugal force acting on the bed, and thus affects the rolling and cascading motions. The flow rate and temperature of cooling air that can be drawn through the structure 502 via the cooling system 368 also affects the rate of particle formation.

The feeding of the slurry and the coating of partially dissolved metal nitrate prills with the medium occurs primarily in the first region 508 of the rotatable structure 502. After the coated particles formed in the first region 508 collectively form a sufficient rolling bed depth, the coated particles located at the top of the bed flow over the third and fourth annular retaining walls 534 and 536 and into the second region 510.

The second region 510 of the rotatable structure 502 serves mainly as a rotating cooler, with the second elongated lifting flights 528 serving to provide the rolling and cascading motions of the particles. The plurality of angled third elongated flight 544 obstruct the particles and prevent them from backflowing over the third and fourth annular retaining walls 534 and 536 and retaining ring 538 and into the first region 508. The depth of the rolling bed in the second region 510 is principally controlled by the height of the second annular retaining wall 532. The continuous ingress of particles from the first region 508 and into the rolling bed of the second region 510 causes the coated particles located at the top of the bed near the outlet portion 514 to flow over the second annular retaining wall 532. The coated particles are thereby discharged from the outlet portion 514 of the rotatable structure 502.

The cooled coated particles discharged from the drum arrangement 500 are screened into oversized, undersized, and product size by a screener 370, such as a double deck Rotex screener equipped with a 4 mesh top screen and a 8 mesh bottom screen. The oversized and undersized particles can be returned to the recycle feeder 354 via conduits 372 and 374, with the oversized particles being milled to less than about ¾ inch in maximum effective diameter before being provided to the recycle feeder 354.

The product size material is conveyed via conduit 378 to a final screener 376, such as a sweco screener so that the relatively smaller product-sized particles can be separated and recycled back to the inlet portion 512 of the rotatable structure 502 via conduit 380. The resulting granular coated particles 100 removed via conduit 382 and can be further treated and conditioned. The weight ratio of product size material recycled to the drum arrangement 500 via conduit 380 to the resulting product removed via conduit 382 can be in a range of from about 2:1 to about 1:15.

The above-discussed process is preferably conducted in a low relative humidity environment, since the material is very hygroscopic. Low moisture content of the atmosphere prevents moisture uptake throughout the process and results in a low moisture content of the granular coated particle 100. By lowering the moisture content of the granular coated particles 100, the granular coated particles 100 are made stronger and denser.

In its broadest aspects, several variations and modifications to the above-discussed process can be implemented without departing from the scope of the present invention.

For example, the mixer 350 employed in the process of the present invention is not limited to the pug mill apparatus 400. Moreover, where a pug mill apparatus is selected as the mixer 350, the configuration of the pug mill apparatus and the arrangement of its components can exhibit several variations and modifications from that illustrated in FIGS. 4A to 4C. For example, more than two rotatable shafts can be received in the receptacle housing; the shafts 412 and 414 also can be disposed in non-parallel arrangement, and do not have to be confined in coplanar relationship. The paddles 420 also can undertake various configurations and can be arranged at different positions and orientations about their respective rotatable shafts 412 and 414.

The inlet port 434 of the molten material entering the pug mill apparatus 400 need not be located upstream from both the urea and metal nitrate inlet ports 430 and 432, although the inlet port 434 preferably is so arranged. For example, the urea and the preheated metal nitrate prills alternatively can be premixed prior to introduction to the pug mill apparatus 400, can be fed through a single inlet port (not shown) that receives both the urea and preheated metal nitrate prills, or can be fed through multiple inlet and/or outlet ports (not shown) staggered along the length of the receptacle 402. Furthermore, additives such as magnesium oxide can be introduced into the melter 356 or introduced directly into the mixer 350 via a separate flow stream.

It is further understood that several variations and modifications to the above-discussed drum arrangement 500 can be implemented without departing from the scope of the present invention. For example, the first coating and cooling region 508 can constitute the entire rotatable structure 502, with the second cooling region 510 being provided in a separate rotatable structure. The first and second regions 508 and 510 could also be combined into one region, although the cooling efficiency of the drum arrangement would thereby be sacrificed.

As still further modifications to the drum arrangement 400, two or more rotatable structures can be arranged in series (not shown), with some or all of the rotatable structures having feed distribution systems for receiving a portion of the slurry from the conduit 358, which slurry is apportioned and allocated among the series of rotatable structures. In this modified embodiment, the recycled product could be conveyed via conduit 380 to the respective inlet portions of one or more of the series of rotatable structures. These rotatable structures also can possess different configurations from each other and from the illustrated embodiment, and can be equipped with different components, including variant flight arrangements (or no flights), feed distribution systems, cooling regions, etc. One or more of the rotatable structures also can be arranged at an inclination so as to facilitate the movement of particles towards the outlet of the structure.

The first and/or second feed distributors 600 and 700 also can be equipped with several variations and modifications. Modifications can be made or alternative devices can be provided to the paddles 622, helical conveyer 620, and V-shaped weirs 616 of the first feed distributor 600, and the paddles 722 and slanted chute 724 of the second feed distributor 700.

The air lance 800 can exhibit alternative configurations, and need not be an elongated structure having a triangular cross section.

The granular coated particles 100 removed via conduit 382 and can be further treated and conditioned, for example and without limitation, in a rotating drum containing canted lifting flights. Parting agents, such as Kaolin, can be deposited in the front portion of the conditioning drum chamber and mixed with the granular coated particles 100 to prepare the surface layer 106. Anticaking agents or other additives also can be applied to the particles 100 by, for example, spraying the additives into the cascading particles in the conditioning drum. The particles 100 can then be subjected to additional cooling steps by use of, for example, a rotating cooling drum or fluidized bed.

The following non-limiting examples serve to explain embodiments of the present invention in more detail.

EXAMPLE I

Granular coated particles containing sodium nitrate were prepared in a pilot plant as follows.

After start-up, sodium nitrate prills were screened to remove fines with a 1.3 mm opening screen on a Rotex type screener, and thereafter heated to about 165° C. in a fluidized bed. 1360 lbs/hours of the screened and preheated sodium nitrate prills, 640 lbs/hour of screened powdered urea (diameters of screen urea particles less than 0.5 mm), and 100 lbs/hour of recycled molten material were introduced to a pug mill apparatus. The molten material was formed in a melter containing three uniformly-spaced propeller agitators rotated at about 200 rpm; the bottom propeller was 1 inch from the bottom of the melter, and the other two propellers were evenly spaced over a 14 inch region above the first propeller. The melter also was equipped with a steam jacket through which steam at a pressure of 40 psig was passed.

The pug mill apparatus had an operating cavity of 1.2 cubic feet and was equipped with a steam jacket. The pug mill apparatus contained two parallel shafts, each shaft being equipped with 15 angled paddles. The shafts were rotated in opposite directions at 192 rpm to produce a tip speed of 320 fpm. The residence time of feed passing through the pug mill apparatus and exiting as a slurry was about 2.1 minutes.

The slurry was transferred to a coating and cooling drum arrangement comprising a 6 feet diameter by 6 feet long rotating structure having first and second regions separated by a 5.5 inch high retaining ring. The first region extended about 3.5 feet into the drum, and was equipped with a 4 inch by 4 inch retaining wall at the inlet of the drum, and a 3 inch wide by 4 inch high retaining wall positioned adjacent the retaining ring. The first lifting flights employed in the first region were backward canted at a 45 degree angle and had a height that increased across the length of the first region, so that the end of each first lifting flight proximal to the inlet was about 3.25 inches, and the height of the end distal relative to the inlet was about 4 inches.

The first region was equipped with first and second steam-jacketed feed distributors and an air lance as described above. The air lance expelled air at a pressure of about 6.5 psig and a flow rate of about 44 feet$^3$/min (1 atm, 70° F.). The temperature of the slurry discharged from the feed distribution system and into the rolling bed was about 82° C., and the temperature of the rolling bed in the rotating structure was about 70° C. The structure was rotated at about 11 rpm.

The second region of the rotating structure contained second lifting flights for cooling and discharging the particles. The second lifting flights had a uniform height of about 2 inches. Disposed in the second region were a 2 inch by 2 inch retaining wall adjacent the retaining ring, and a 2 inch high by 4 inch wide retaining wall adjacent the outlet of the rotating structure. Also disposed in the second region were 17 inch long, 2 inch high third flights which extended from the retaining ring and were angled to prevent the backflow of particles into the first region of the structure.

The particle flow stream leaving the process via conduit 382 was 2000 lbs/hr, and the recycled flow stream of relatively smaller product-sized particles returned to the rotating structure via conduit 380 was 3000 lbs/hr.

The 2000 lbs/hr particle flow stream was fed to a rotating cylindrical conditioning drum dimensioned 3 feet in diameter by 3 feet in length. The drum included 3 inch high flights canted backwards at an oblique angle α of 45 degrees and a 2.6 inch high retaining ring at the discharge end to maintain the operating depth of the bed at approximately 3 inches. Both the inlet and outlet of the drum were fitted with 2 inch by 2 inch retaining walls disposed against respective retaining rings. As the conditioning drum was rotated at 12 rpm, Kaolin was fed into the conditioning drum at drum inlet by a volumetric feeder, which pours the Kaolin onto the bed at a feed rate of 20 lb/hr. Petro-X also was fed into the conditioning drum at a feed rate of 0.4 lb/hr and was atomized onto the bed at a position about halfway along the drum length by an air atomizing nozzle.

The temperature of the ambient atmosphere in which the process was conducted was about 18° C.

The product yield for the drum of EXAMPLE I ranged between about 97 to 99 percent. Product yield for the overall process was 100%.

The granular coated particles had an outer maximum effective diameter ranging from about 2.38 mm to about 2.83 mm. The crush strengths of the granular coated particles were measured by a Chatillon Digit Force Meter, Model # DFM-50 in accordance with a conventional crushing test method, such as the method disclosed in the Fertilizer Manual produced by the International Fertilizer Development Center. The crush strengths ranged between 5.25 lbs to 9.5 lbs, with an average of 6.8 lbs. The moisture content of the granular coated particles ranged from about 0.36% by weight to about 0.39% by weight. The mixture of urea and sodium nitrate in the first coating layer exhibited a crystalline structure, with the crystals having dimensions of about 5 $\mu$m×5 $\mu$m×5 $\mu$m.

EXAMPLE II

Granular coated particles containing sodium nitrate and a magnesium oxide additive were prepared in a pilot plant containing the same melter, pug mill apparatus, and coating and cooling drum arrangement as indicated above in EXAMPLE I.

After start-up, sodium nitrate prills were screened to remove fines with a 1.3 mm opening screen on a Rotex type screener, and thereafter heated to about 151° C. in a fluidized bed. 1360 lbs/hours of the screened and preheated sodium nitrate prills, 640 lbs/hour of screened powdered urea (diameters of screen urea particles less than 0.5 mm), and 215 lbs/hour of recycled molten material were introduced to a pug mill apparatus. The molten material was formed in the melter, with magnesium oxide being added to the melter in such an amount as to provide a finished product having a magnesium oxide concentration of about 3.5% by weight.

The shafts of the pug mill were rotated in opposite directions at 192 rpm to produce a tip speed of 320 fpm. The residence time of feed passing through the pug mill apparatus and exiting as a slurry was about 2.0 minutes.

The temperature of the slurry discharged from the feed distribution system and into the rolling bed was about 82° C. The slurry was intercepted by a pressurized air stream expelled from the air lance expelled air at a pressure of about 7 psig and a flow rate of about 45 feet$^3$/min (1 atm, 70° F.). The temperature of the rolling bed in the rotating structure was about 70° C. The structure was rotated at about 11 rpm.

The particle flow stream leaving the process via conduit 382 was 2000 lbs/hr, and the recycled flow stream of relatively smaller product-sized particles returned to the rotating structure via conduit 380 was 4250 lbs/hr.

The 2000 lbs/hr particle flow stream was fed to a rotating cylindrical conditioning drum identical to the conditioning drum described above in connection with EXAMPLE I. As the conditioning drum was rotated at 12 rpm, Kaolin was fed into the conditioning drum at drum inlet by a volumetric feeder at a feed rate of 20 lb/hr.

The temperature of the ambient atmosphere in which the process was conducted was about 18° C.

The product yield for the drum of EXAMPLE II ranged between about 97 to 98 percent. Product yield for the overall process was 100%.

EXAMPLE III

Granular coated particles containing potassium nitrate were prepared in a pilot plant containing the same melter, pug mill apparatus, and coating and cooling drum arrangement as described above in EXAMPLE I.

After start-up, sodium nitrate prills were screened to remove fines with a 1.3 mm opening screen on a Rotex type screener, and thereafter heated to about 185° C. in a fluidized bed. 1050 lbs/hours of the screened and preheated sodium nitrate prills, 500 lbs/hour of screened powdered urea (screen urea particles having diameters less than 0.5 mm), and 350 lbs/hour of recycled molten material including sufficient virgin urea to provide the recycled molten material with a eutectic composition were introduced to a pug mill apparatus.

The shafts of the pug mill were rotated in opposite directions at 192 rpm to produce a tip speed of 320 fpm. The residence time of feed passing through the pug mill apparatus and exiting as a slurry was about 2.2 minutes.

The temperature of the slurry discharged from the feed distribution system and into the rolling bed was about 108° C. The slurry was intercepted by a pressurized air stream expelled from the air lance expelled air at a pressure of about 15 psig and a flow rate of about 68 feet$^3$/min (1 atm, 70° F). The temperature of the rolling bed in the rotating structure was about 95° C. The structure was rotated at about 11 to about 14 rpm.

The particle flow stream leaving the process via conduit 382 was 1550 lbs/hr, and the recycled flow stream of relatively smaller product-sized particles returned to the rotating structure via conduit 380 was 4000 lbs/hr.

The temperature of the ambient atmosphere in which the process was conducted was about 18° C.

The product yield for the drum of EXAMPLE III ranged between about 88 to 95 percent. Product yield for the process was 100%.

COMPARATIVE EXAMPLE I

Granular coated particles containing sodium nitrate were prepared in a bench scale pilot plant as follows.

Five hundred grams of sodium nitrate prills were combined with 20 grams of urea dust and 70 grams of water in a 500 ml beaker. This mixture was agitated continuously while heated to about 128° F. using a laboratory hot plate. As the material was heated and agitated, a slurry was formed. The slurry was heated for 20 minutes at 128° F. to dry the mixture.

The slurry was transferred to a coating and drying drum arrangement comprising a 14 inch diameter by 3.5 inch length rotating structure. The structure had one closed end and an opposing open end having a 2.5 inch retaining ring. The drum included six ⅛-inch diameter anti-slip rods.

The drum was preheated with indirect heat applied to the outer shell using a heat gun and a propane torch, so that the outer surface temperature of the drum was about 140° F. to 150° F. as measured by a infrared temperature recorder. The slurry was introduced into the drum, which was rotated during drying at 24 rpm, and allowed to cascade until all of the granules were free flowing. As moisture was released from the slurry primarily as vapor, the vapor was removed from the inside of the drum utilizing a laboratory blower pulling vacuum. The heat source (i.e., the heat gun and propane torch) was removed from the drum shell and the drum was allowed to cool via ambient air until the surface temperature of the product was about 90° F.

The granular coated particles had an outer maximum effective diameter ranging from about 2.38 mm to about 2.83 mm. The crush strengths of the granular coated particles ranged between 1.65 lbs to 3.25 lbs, and averaged about 2.34 lbs. The mixture of urea and sodium nitrate in the first coating layer exhibited a crystalline structure, with the crystals having dimensions of about 450 $\mu$m×300 $\mu$m×450 $\mu$m.

Thus, the granular coated particles prepared in accordance with the comparative example did not exhibit the superior crush strengths of the granular coated particles of the present invention.

It will thus be seen that the objectives and principles of this invention have been fully and effectively accomplished. It will be realized, however, that the foregoing preferred specific embodiments have been shown and described for the purpose of this invention and are subject to change without departure from such principles. Therefore, this invention includes all variations, modifications, and improvements encompassed within the spirit and scope of the appended following claims.

What is claimed is:

1. Granular coated particles suitable for use alone or in combination with other granular particles as a nitrogen-dispersing fertilizer, said granular coated particles comprising:

discrete core particles formed from a composition consisting essentially of at least one metal nitrate; and coating layers respectively surrounding said discrete core particles to isolate individual ones of said discrete core particles from each other, said coatings layers being formed from a substantially anhydrous mixture comprising urea and said metal nitrate and having a melting temperature lower than the melting temperature of urea, wherein said granular coated particles contain at least 10 wt % and no more than about 60 wt % of urea.

2. Granular coated particles according to claim 1, wherein the proportion of said urea to said metal nitrate in said mixture is selected so as to provide a eutectic mixture.

3. Granular coated particles according to claim 1, wherein said coating layers contain a substantially uniform dispersion of said metal nitrate in said urea.

4. Granular coated particles according to claim 1, wherein said granular coated particles further comprise respective transition phases between said discrete core particles and said coating layers.

5. Granular coated particles according to claim 1, wherein said coating layers are first coating layers, and wherein said granular coated particles further comprise second coating layers respectively surrounding said first coating layers and comprising a parting agent which suppresses agglomeration of said granular coated particles with each other.

6. Granular coated particles according to claim 1, wherein said granular coated particles have maximum effective diameters in a range of about 1.0 to about 3.5 mm.

7. Granular coated particles according to claim 1, wherein said granular coated particles have maximum effective diameters in a range of about 1.5 mm to about 3.0 mm.

8. Granular coated particles according to claim 1, wherein said metal nitrate is sodium nitrate.

9. Granular coated particles according to claim 1, wherein said metal nitrate is potassium nitrate.

10. Granular coated particles according to claim 1, wherein said coated particles contain at least 30% and no more than 45% by weight urea.

11. Granular coated particles according to claim 1, wherein said coating layers contain magnesium oxide.

12. Granular coated particles according to claim 5, wherein said second coating layer is formed from at least one member selected from the group consisting of an liquid-based anticaking agent and a parting agent.

13. Granular coated particles according to claim 1, wherein said coating layer contain at least one member, other than nitrogen and potassium, selected from the group consisting of a micronutrient and a macronutrient.

14. Granular coated particles according to claim 1, wherein said granular coated particles are substantially spherical.

15. Granular coated particles according to claim 1, wherein each of said discrete core particles are formed from respective prills.

16. Granular coated particles according to claim 1, wherein said granular coated particles exhibit an average crush strength in a range of from about 5.25 lbs to about 9.5 lbs.

17. Granular coated particles according to claim 1, wherein said coating layers possess a crystalline structure, with the crystals having dimensions of not more than about 5 $\mu$m×5 $\mu$m×5 $\mu$m.

18. Granular coated particles according to claim 1, wherein said substantially anhydrous mixture contains not more than 1% by weight of water.

19. Granular coated particles according to claim 18, wherein said substantially anhydrous mixture contains not more than 0.4% by weight of water.

20. Granular coated particles according to claim 19, wherein said substantially anhydrous mixture contains not more than 0.1% by weight of water.

21. A process for preparing a plurality of granular coated particles suitable for use alone or in combination with other granular particles as a nitrogen-dispersing fertilizer, said process comprising:

mixing particles consisting essentially of at least one metal nitrate with at least a substantially molten mixture comprising both a first urea portion and the metal nitrate and a second urea portion to partially dissolve the metal nitrate particles into the substantially molten mixture and the second urea portion and form a slurry while leaving cores of said metal nitrate particles intact; and forming granular coated particles from the slurry, said granular coated particles comprising discrete core particles formed from the intact cores of the metal nitrate particles and coating layers respectively surrounding the discrete core particles to isolate individual ones of the discrete core particles from each other, the granular coated particles containing at least 10 wt % and no more than about 60 wt % of urea.

22. A process according to claim 21, wherein said forming step is performed via granulation within a rotating assembly.

23. A process according to claim 21, wherein the metal nitrate is sodium nitrate.

24. A process according to claim 21, wherein the metal nitrate is potassium nitrate.

25. A process according to claim 21, further comprising preheating the metal nitrate particles prior to said mixing step.

26. A process according to claim 25, wherein said preheating step is performed in a fluidized bed.

27. A process according to claim 21, wherein said mixing step is performed in a pug mill.

28. A process according to claim 21, further comprising recycling a portion of the granular coated particles to prepare a portion of the substantially molten mixture.

29. A process according to claim 21, further comprising recycling a portion of the granular coated particles into said mixing step.

30. A process for preparing a plurality of granular coated particles suitable for use alone or in combination with other granular particles as a nitrogen-dispersing fertilizer, said process comprising:

mixing particles consisting essentially of at least one metal nitrate with at least a substantially molten mixture comprising a first urea portion and the metal nitrate and with a second urea portion, said mixing being performed in a mixing apparatus to partially dissolve the metal nitrate particles into the substantially molten mixture and form a slurry while leaving core portions of the metal nitrate particles intact; and conveying at least a portion of the slurry to a rotating assembly, forming granular coated particles from the slurry via granulation within the rotating assembly, and removing at least a portion of the granular coated particles from the rotating assembly as a product stream, the granular coated particles of the product stream comprising discrete core particles formed from the intact cores of the metal nitrate particles and coating layers respectively surrounding the discrete core particles to isolate individual ones of the discrete core particles from each other, the product stream of the granular coated particles containing at least 10 wt % and no more than about 60 wt % of urea.

31. A process according to claim 30, wherein the metal nitrate is sodium nitrate.

32. A process according to claim 30, wherein the metal nitrate is potassium nitrate.

33. A process according to claim 30, further comprising preheating the metal nitrate particles prior to said mixing step to a temperature sufficiently high to partially melt the metal nitrate particles and to melt the second urea portion.

34. A process according to claim 33, wherein said preheating step is performed in a fluidized bed.

35. A process according to claim 30, wherein the mixing apparatus is a pug mill.

36. A process according to claim 30, further comprising removing a portion of the granular coated particles from the rotating assembly as a recycle stream, melting the recycle stream in a melter, and adding the melted recycle stream to the mixing apparatus.

37. A process according to claim 30, further comprising removing a portion of the granular coated particles from an exit region of the rotating assembly as a recycle stream and recycling the recycle stream back into an entrance region of the rotating assembly.

38. A process according to claim 37, wherein a weight ratio of the recycle steam to the product stream is in a range of from about 2:1 to about 1:15.

39. A process according to claim 37, wherein a weight ratio of the recycle stream to the product stream is in a range of from about 1:1 to about 1:3.5.

40. A process according to claim 30, further comprising:

removing a portion of the granular coated particles from the rotating assembly as a first recycle stream, melting the first recycle stream in a melter, and adding the melted first recycle stream to the mixing apparatus; and removing a portion of the granular coated particles from an exit region of the rotating assembly as a second recycle stream and recycling the second recycle stream back into an entrance region of the rotating assembly.

41. A process according to claim 40, wherein the mixing apparatus is a progressive mixing apparatus, and wherein the substantially molten mixture is introduced into the progressive mixing apparatus upstream from respective positions at which the second urea portion and the metal nitrate particles are introduced into the progressive mixing apparatus.

* * * * *